(12) United States Patent
Yousaf et al.

(10) Patent No.: US 10,552,531 B2
(45) Date of Patent: Feb. 4, 2020

(54) COLLABORATIVE SPREADSHEET DATA VALIDATION AND INTEGRATION

(71) Applicant: Palantir Technologies Inc., Palo Alto, CA (US)

(72) Inventors: Timothy Yousaf, New York, NY (US); Yichen Xing, Potomac, MD (US); Rhys Brett-Bowen, London (GB)

(73) Assignee: Palantir Technologies Inc., Palo Alto, CA (US)

( * ) Notice: Subject to any disclaimer, the term of this patent is extended or adjusted under 35 U.S.C. 154(b) by 0 days.

(21) Appl. No.: 15/258,918

(22) Filed: Sep. 7, 2016

(65) Prior Publication Data

US 2018/0046608 A1   Feb. 15, 2018

Related U.S. Application Data

(60) Provisional application No. 62/373,615, filed on Aug. 11, 2016.

(51) Int. Cl.
*G06F 17/24* (2006.01)
*G06F 16/27* (2019.01)
(Continued)

(52) U.S. Cl.
CPC .............. *G06F 17/246* (2013.01); *G06F 3/14* (2013.01); *G06F 17/243* (2013.01);
(Continued)

(58) Field of Classification Search
None
See application file for complete search history.

(56) References Cited

U.S. PATENT DOCUMENTS 5,418,950 A   5/1995 Li et al.
5,428,737 A   6/1995 Li et al.
(Continued)

FOREIGN PATENT DOCUMENTS

DE   102014103476 A1   9/2014
EP       1647908 A2   4/2006
(Continued)

OTHER PUBLICATIONS

"A Quick Guide to UniProtKB Swiss-Prot & TrEMBL", UniProt Consortium, Ongoing and future developments at the Universal Protein Resource, (Sep. 2011), 1-2.
(Continued)

*Primary Examiner* — Uyen T Le
(74) *Attorney, Agent, or Firm* — Schwegman Lundberg & Woessner, P.A.

(57) ABSTRACT

A system comprising a computer-readable storage medium storing at least one program and a method for integrating collaborative spreadsheet data into one or more network applications is presented. The method may include accessing an application data schema comprising a set of constraints on application data consumed by an application hosted by an application server. The method may further include accessing a spreadsheet having one or more data validation rules. The method may further include determining whether the one or more data validation rules include the set of constraints. In response to determining the one or more data validation rules include the set of constraints, application data consumed by the application is synchronized with spreadsheet data corresponding to the spreadsheet.

20 Claims, 17 Drawing Sheets

(51) Int. Cl.
*G06F 3/0481* (2013.01)
*G06F 3/14* (2006.01)
*G06F 17/27* (2006.01)
*G06F 17/22* (2006.01)
*H04L 29/08* (2006.01)

(52) U.S. Cl.
CPC ...... *G06F 17/2725* (2013.01); *H04L 67/1095* (2013.01); *G06F 3/0481* (2013.01); *G06F 17/2288* (2013.01)

(56) References Cited

U.S. PATENT DOCUMENTS

| | | | |
|---|---|---|---|
| 5,428,776 A | 6/1995 | Rothfield | |
| 5,542,089 A | 7/1996 | Lindsay et al. | |
| 5,608,899 A | 3/1997 | Li et al. | |
| 5,613,105 A | 3/1997 | Zbikowski et al. | |
| 5,701,456 A | 12/1997 | Jacopi et al. | |
| 5,724,575 A | 3/1998 | Hoover et al. | |
| 5,794,228 A | 8/1998 | French et al. | |
| 5,794,229 A | 8/1998 | French et al. | |
| 5,857,329 A | 1/1999 | Bigham | |
| 5,911,138 A | 6/1999 | Li et al. | |
| 5,918,225 A | 6/1999 | White et al. | |
| 6,208,985 B1 | 3/2001 | Krehel | |
| 6,236,994 B1 | 5/2001 | Swartz et al. | |
| 6,289,334 B1 | 9/2001 | Reiner et al. | |
| 6,311,181 B1 | 10/2001 | Lee et al. | |
| 6,321,274 B1 | 11/2001 | Shakib et al. | |
| 6,643,613 B2 | 11/2003 | McGee et al. | |
| 6,745,382 B1 | 6/2004 | Zothner | |
| 6,851,108 B1 | 2/2005 | Syme et al. | |
| 6,857,120 B1 | 2/2005 | Arnold et al. | |
| 6,877,137 B1 | 4/2005 | Rivette et al. | |
| 6,976,024 B1 | 12/2005 | Chavez, Jr. et al. | |
| 7,028,223 B1 | 4/2006 | Kolawa et al. | |
| 7,085,890 B2 | 8/2006 | Kashyap | |
| 7,155,728 B1 | 12/2006 | Prabhu et al. | |
| 7,216,133 B2 | 5/2007 | Wu et al. | |
| 7,225,189 B1* | 5/2007 | McCormack | G06F 17/246 |
| 7,406,592 B1 | 7/2008 | Polyudov | |
| 7,519,589 B2 | 4/2009 | Charnock et al. | |
| 7,546,286 B2* | 6/2009 | Dickinson | G06F 17/246 |
| 7,546,353 B2 | 6/2009 | Hesselink et al. | |
| 7,610,290 B2 | 10/2009 | Kruy et al. | |
| 7,627,489 B2 | 12/2009 | Schaeffer et al. | |
| 7,783,679 B2 | 8/2010 | Bley | |
| 7,853,573 B2 | 12/2010 | Warner et al. | |
| 7,877,421 B2 | 1/2011 | Berger et al. | |
| 7,908,521 B2 | 3/2011 | Sridharan et al. | |
| 7,966,426 B2 | 6/2011 | Smith et al. | |
| 7,979,424 B2 | 7/2011 | Dettinger | |
| 8,073,857 B2 | 12/2011 | Sreekanth | |
| 8,103,962 B2 | 1/2012 | Embley et al. | |
| 8,108,779 B1* | 1/2012 | Rein | G06F 17/30011 715/733 |
| 8,140,958 B2* | 3/2012 | Garrett | G06F 17/30348 709/202 |
| 8,417,715 B1 | 4/2013 | Bruckhaus | |
| 8,429,194 B2 | 4/2013 | Aymeloglu et al. | |
| 8,433,702 B1 | 4/2013 | Carrino et al. | |
| 8,499,287 B2 | 7/2013 | Shafi et al. | |
| 8,560,494 B1 | 10/2013 | Downing et al. | |
| 8,639,552 B1 | 1/2014 | Chen et al. | |
| 8,676,937 B2 | 3/2014 | Rapaport et al. | |
| 8,799,867 B1 | 8/2014 | Peri-Glass et al. | |
| 8,892,679 B1 | 11/2014 | Destagnol et al. | |
| 8,909,597 B2 | 12/2014 | Aymeloglu et al. | |
| 8,924,429 B1 | 12/2014 | Fisher et al. | |
| 8,935,201 B1 | 1/2015 | Fisher et al. | |
| 9,031,981 B1 | 5/2015 | Potter et al. | |
| 9,105,000 B1 | 8/2015 | White et al. | |
| 9,292,388 B2 | 3/2016 | Fisher et al. | |
| 9,330,120 B2 | 5/2016 | Downing et al. | |
| 9,348,677 B2 | 5/2016 | Marinelli | |
| 9,378,526 B2 | 6/2016 | Sampson | |
| 10,068,031 B2 | 9/2018 | Moore et al. | |
| 10,133,783 B2 | 11/2018 | Kromwijk et al. | |
| 2002/0184111 A1 | 12/2002 | Swanson | |
| 2003/0004770 A1 | 1/2003 | Miller et al. | |
| 2003/0023620 A1 | 1/2003 | Trotta | |
| 2003/0105833 A1 | 6/2003 | Daniels et al. | |
| 2003/0212670 A1 | 11/2003 | Yalamanchi et al. | |
| 2004/0088177 A1 | 5/2004 | Travis et al. | |
| 2004/0098731 A1 | 5/2004 | Demsey et al. | |
| 2004/0103088 A1 | 5/2004 | Cragun et al. | |
| 2004/0126840 A1 | 7/2004 | Cheng et al. | |
| 2004/0139212 A1 | 7/2004 | Mukherjee | |
| 2004/0153837 A1 | 8/2004 | Preston et al. | |
| 2004/0193608 A1 | 9/2004 | Gollapudi et al. | |
| 2004/0254658 A1 | 12/2004 | Sherriff et al. | |
| 2004/0260702 A1 | 12/2004 | Cragun et al. | |
| 2005/0004911 A1 | 1/2005 | Goldberg et al. | |
| 2005/0021397 A1 | 1/2005 | Cui et al. | |
| 2005/0120080 A1 | 6/2005 | Weinreb et al. | |
| 2005/0183005 A1 | 8/2005 | Denoue et al. | |
| 2005/0226473 A1 | 10/2005 | Ramesh | |
| 2005/0278286 A1 | 12/2005 | Djugash et al. | |
| 2006/0004740 A1 | 1/2006 | Dettinger et al. | |
| 2006/0070046 A1 | 3/2006 | Balakrishnan et al. | |
| 2006/0074967 A1 | 4/2006 | Shaburov | |
| 2006/0080616 A1 | 4/2006 | Vogel et al. | |
| 2006/0116991 A1 | 6/2006 | Calderwood | |
| 2006/0129992 A1 | 6/2006 | Oberholtzer et al. | |
| 2006/0142949 A1 | 6/2006 | Helt | |
| 2006/0209085 A1 | 9/2006 | Wong et al. | |
| 2006/0271838 A1 | 11/2006 | Carro | |
| 2006/0271884 A1 | 11/2006 | Hurst | |
| 2006/0288046 A1 | 12/2006 | Gupta | |
| 2007/0005582 A1 | 1/2007 | Navratil et al. | |
| 2007/0027851 A1 | 2/2007 | Kruy et al. | |
| 2007/0094248 A1 | 4/2007 | McVeigh et al. | |
| 2007/0113164 A1 | 5/2007 | Hansen et al. | |
| 2007/0150805 A1 | 6/2007 | Misovski | |
| 2007/0168336 A1 | 7/2007 | Ransil et al. | |
| 2007/0178501 A1 | 8/2007 | Rabinowitz et al. | |
| 2007/0192281 A1 | 8/2007 | Cradick et al. | |
| 2007/0260582 A1 | 11/2007 | Liang | |
| 2007/0286099 A1* | 12/2007 | Stocklein | H04L 67/22 370/259 |
| 2008/0126344 A1 | 5/2008 | Hoffman et al. | |
| 2008/0126951 A1 | 5/2008 | Sood et al. | |
| 2008/0155440 A1 | 6/2008 | Trevor et al. | |
| 2008/0196016 A1 | 8/2008 | Todd | |
| 2008/0201313 A1 | 8/2008 | Dettinger et al. | |
| 2008/0215543 A1 | 9/2008 | Huang et al. | |
| 2008/0267386 A1 | 10/2008 | Cooper | |
| 2009/0006150 A1 | 1/2009 | Prigge et al. | |
| 2009/0007056 A1 | 1/2009 | Prigge et al. | |
| 2009/0043762 A1 | 2/2009 | Shiverick et al. | |
| 2009/0055487 A1 | 2/2009 | Moraes et al. | |
| 2009/0083275 A1 | 3/2009 | Jacob et al. | |
| 2009/0094217 A1 | 4/2009 | Dettinger et al. | |
| 2009/0144747 A1 | 6/2009 | Baker | |
| 2009/0161147 A1 | 6/2009 | Klave | |
| 2009/0172674 A1 | 7/2009 | Bobak et al. | |
| 2009/0187556 A1 | 7/2009 | Ross et al. | |
| 2009/0193012 A1 | 7/2009 | Williams | |
| 2009/0199047 A1 | 8/2009 | Vaitheeswaran et al. | |
| 2009/0248721 A1 | 10/2009 | Burton et al. | |
| 2009/0260060 A1* | 10/2009 | Smith | H04L 63/105 726/3 |
| 2009/0282068 A1 | 11/2009 | Shockro et al. | |
| 2009/0299830 A1 | 12/2009 | West et al. | |
| 2010/0011282 A1 | 1/2010 | Dollard et al. | |
| 2010/0070464 A1 | 3/2010 | Aymeloglu et al. | |
| 2010/0073315 A1 | 3/2010 | Lee et al. | |
| 2010/0082671 A1 | 4/2010 | Li et al. | |
| 2010/0145902 A1 | 6/2010 | Boyan et al. | |
| 2010/0161646 A1 | 6/2010 | Ceballos et al. | |
| 2010/0169376 A1 | 7/2010 | Chu | |
| 2010/0169405 A1 | 7/2010 | Zhang | |
| 2010/0199167 A1 | 8/2010 | Uematsu et al. | |
| 2010/0229052 A1 | 9/2010 | Cuneo et al. | |

(56) References Cited

U.S. PATENT DOCUMENTS

| | | |
|---|---|---|
| 2010/0313119 A1 | 12/2010 | Baldwin et al. |
| 2011/0035396 A1 | 2/2011 | Merz et al. |
| 2011/0041084 A1 | 2/2011 | Karam |
| 2011/0066497 A1 | 3/2011 | Gopinath et al. |
| 2011/0074811 A1 | 3/2011 | Hanson et al. |
| 2011/0093490 A1 | 4/2011 | Schindlauer et al. |
| 2011/0131547 A1 | 6/2011 | Elaasar |
| 2011/0137875 A1 | 6/2011 | Ziauddin et al. |
| 2011/0145401 A1 | 6/2011 | Westlake |
| 2011/0185305 A1* | 7/2011 | Lai .................... G06F 17/246 715/772 |
| 2011/0208822 A1 | 8/2011 | Rathod |
| 2011/0252282 A1 | 10/2011 | Meek et al. |
| 2011/0258216 A1 | 10/2011 | Supakkul |
| 2011/0270871 A1 | 11/2011 | He et al. |
| 2011/0321008 A1 | 12/2011 | Jhoney et al. |
| 2012/0078595 A1 | 3/2012 | Balandin et al. |
| 2012/0102022 A1 | 4/2012 | Miranker et al. |
| 2012/0159449 A1 | 6/2012 | Arnold et al. |
| 2012/0173381 A1 | 7/2012 | Smith |
| 2012/0174057 A1 | 7/2012 | Narendra et al. |
| 2012/0188252 A1 | 7/2012 | Law |
| 2012/0284719 A1 | 11/2012 | Phan et al. |
| 2013/0024268 A1 | 1/2013 | Manickavelu |
| 2013/0024731 A1 | 1/2013 | Shochat et al. |
| 2013/0054551 A1 | 2/2013 | Lange |
| 2013/0086482 A1 | 4/2013 | Parsons |
| 2013/0096968 A1 | 4/2013 | Van Pelt et al. |
| 2013/0198624 A1 | 8/2013 | Aymeloglu et al. |
| 2013/0225212 A1 | 8/2013 | Khan |
| 2013/0226944 A1 | 8/2013 | Baid et al. |
| 2013/0232220 A1 | 9/2013 | Sampson |
| 2014/0012886 A1 | 1/2014 | Downing et al. |
| 2014/0074888 A1 | 3/2014 | Potter et al. |
| 2014/0108074 A1 | 4/2014 | Miller et al. |
| 2014/0115589 A1 | 4/2014 | Marinelli, III et al. |
| 2014/0115610 A1 | 4/2014 | Marinelli, III et al. |
| 2014/0214579 A1 | 7/2014 | Shen et al. |
| 2014/0244388 A1 | 8/2014 | Manouchehri et al. |
| 2015/0026075 A1 | 1/2015 | Mondri et al. |
| 2015/0112641 A1 | 4/2015 | Faraj |
| 2015/0269030 A1 | 9/2015 | Fisher et al. |
| 2016/0026923 A1 | 1/2016 | Erenrich et al. |
| 2016/0173594 A1* | 6/2016 | Nelson .............. H04L 67/1095 709/205 |
| 2016/0292206 A1* | 10/2016 | Ruiz Velazquez .......................... G06F 17/30371 |
| 2017/0068712 A1 | 3/2017 | Streufert et al. |
| 2018/0293239 A1 | 10/2018 | Kromwijk et al. |
| 2019/0050405 A1 | 2/2019 | Kromwijk et al. |

FOREIGN PATENT DOCUMENTS

| | | |
|---|---|---|
| EP | 2634745 A1 | 9/2013 |
| EP | 2743839 A1 | 6/2014 |
| EP | 2778986 A1 | 9/2014 |
| EP | 2921975 A1 | 9/2015 |
| EP | 3388960 A1 | 10/2018 |
| GB | 2366498 A | 3/2002 |
| GB | 2508503 B | 1/2015 |
| GB | 2508293 B | 4/2015 |
| HK | 1194178 B | 9/2015 |
| NZ | 616212 A | 1/2015 |
| NZ | 622485 A | 3/2015 |
| NZ | 616299 A | 4/2015 |
| WO | WO-0034895 A1 | 6/2000 |
| WO | WO-2010030917 A2 | 3/2010 |
| WO | WO-2013030595 A1 | 3/2013 |

OTHER PUBLICATIONS

"A Tour of Pinboard", [Online] Retrieved from the internet: <https://pinboard.in/tour/>, (May 15, 2014), 1-6.

"U.S. Appl. No. 13/411,291, Examiner Interview Summary dated Oct. 1, 2015", 3 pgs.

"U.S. Appl. No. 13/411,291, Non Final Office Action dated Jul. 15, 2015", 39 pgs.

"U.S. Appl. No. 13/411,291, Notice of Allowance dated Apr. 22, 2016", 27 pgs.

"U.S. Appl. No. 13/608,864, Final Office Action dated Jun. 8, 2015", 23 pgs.

"U.S. Appl. No. 13/608,864, First Action Interview Pre-Interview Communication dated Mar. 17, 2015", 16 pgs.

"U.S. Appl. No. 13/657,635, Final Office Action dated Oct. 7, 2015", 43 pgs.

"U.S. Appl. No. 13/657,635, Non Final Office Action dated Mar. 30, 2015", 31 pgs.

"U.S. Appl. No. 13/657,635, Notice of Allowance dated Jan. 29, 2016", 10 pgs.

"U.S. Appl. No. 13/657,656, Final Office Action dated May 6, 2015", 29 pgs.

"U.S. Appl. No. 13/657,656, Non Final Office Action dated Oct. 7, 2014", 16 pgs.

"U.S. Appl. No. 13/657,656, Notice of Allowance dated May 10, 2016", 27 pgs.

"U.S. Appl. No. 13/767,779, Notice of Allowance dated Mar. 17, 2015", 28 pgs.

"U.S. Appl. No. 13/827,627, Examiner Interview Summary dated Oct. 20, 2015", 3 pgs.

"U.S. Appl. No. 13/827,627, Final Office Action dated Aug. 26, 2015", 21 pgs.

"U.S. Appl. No. 13/827,627, Non Final Office Action dated Mar. 2, 2015", 27 pgs.

"U.S. Appl. No. 13/827,627, Non Final Office Action dated Dec. 22, 2015", 12 pgs.

"U.S. Appl. No. 13/827,627, Notice of Allowance dated Apr. 11, 2016", 5 pgs.

"U.S. Appl. No. 13/831,791, Final Office Action dated Aug. 6, 2015", 19 pgs.

"U.S. Appl. No. 13/831,791, Non Final Office Action dated Mar. 4, 2015", 20 pgs.

"U.S. Appl. No. 14/019,534, Examiner Interview Summary dated Sep. 4, 2015", 5 pgs.

"U.S. Appl. No. 14/019,534, First Action Interview Pre-Interview Communication dated Jul. 20, 2015", 4 pgs.

"U.S. Appl. No. 14/019,534, Notice of Allowance dated Feb. 4, 2016", 20 pgs.

"U.S. Appl. No. 14/025,653, First Action Interview Pre-interview Communication dated Mar. 3, 2016", 9 pgs.

"U.S. Appl. No. 14/025,653, First Action Interview Pre-Interview Communication dated Oct. 6, 2015", 13 pgs.

"U.S. Appl. No. 14/134,558, Final Office Action dated May 16, 2016", 30 pgs.

"U.S. Appl. No. 14/134,558, Non Final Office Action dated Oct. 7, 2015", 9 pgs.

"U.S. Appl. No. 14/134,558, Office Action dated Aug. 26, 2016", 3 pgs.

"U.S. Appl. No. 14/254,757, Notice of Allowance dated Sep. 10, 2014", 30 pgs.

"U.S. Appl. No. 14/254,773, Notice of Allowance dated Aug. 20, 2014", 23 pgs.

"U.S. Appl. No. 14/304,741, Final Office Action dated Mar. 3, 2015", 24 pgs.

"U.S. Appl. No. 14/304,741, Notice of Allowance dated Apr. 7, 2015", 22 pgs.

"U.S. Appl. No. 14/304,741, Pre-Interview Communication dated Aug. 6, 2014", 13 pgs.

"U.S. Appl. No. 14/581,902, Notice of Allowance dated Nov. 13, 2015", 16 pgs.

"U.S. Appl. No. 14/877,229, Non Final Office Action dated Mar. 22, 2016", 46 pgs.

"U.S. Appl. No. 15/066,970, Notice of Allowance dated Jun. 29, 2016", 13 pgs.

"Australian Application Serial No. 2013237658, Office Action dated Feb. 2, 2015", 5 pgs.

(56) References Cited

OTHER PUBLICATIONS

"Australian Application Serial No. 2013237710, Office Action dated Jan. 16, 2015", 3 pgs.
"Australian Application Serial No. 2014201580, Office Action dated Feb. 27, 2015", 2 pgs.
"Canadian Application Serial No. 2,807,899, Office Action dated Jul. 20, 2015", 3 pgs.
"Canadian Application Serial No. 2,807,899, Office Action dated Oct. 24, 2014", 4 pgs.
"Canadian Application Serial No. 2,807,899, Office Action dated Jun. 14, 2016", 4 pgs.
"Canadian Application Serial No. 2,828,264, Office Action dated Apr. 11, 2016", 4 pgs.
"Canadian Application Serial No. 2,828,264, Office Action dated Apr. 28, 2015", 4 pgs.
"Canadian Application Serial No. 2,829,266, Office Action dated Apr. 1, 2016", 4 pgs.
"Canadian Application Serial No. 2,829,266, Office Action dated Apr. 28, 2015", 3 pgs.
"Delicious", [Online]. Retrieved from the Internet: <URL: http://delicious.com/>, (accessed May 15, 2014), 1 pg.
"European Application Serial No. 13157474.1, Office Action dated Oct. 30, 2015", 5 pgs.
"European Application Serial No. 13157474.1, Summons to oral proceedings mailed Apr. 29, 2016", 6 pgs.
"European Application Serial No. 14159175.0, Office Action dated Feb. 4, 2016", 5 pgs.
"European Application Serial No. 14159175.0, Office Action dated Jul. 17, 2014", 10 pgs.
"European Application Serial No. 14159464.8, Non Final Office Action dated Feb. 18, 2016", 6 pgs.
"European Application Serial No. 14159629.6, Extended European Search Report dated Jul. 31, 2014", 7 pgs.
"European Application Serial No. 14159629.6, Office Action dated Sep. 22, 2014", 2 pgs.
"European Application Serial No. 15159520.4, Extended European Search Report dated Jul. 15, 2015", 9 pgs.
"Frequently Asked Questions about Office Binder 97", [Online]. Retrieved from the Internet: <URL: http://web.archive.org/web/20100210112922/http://support.microsoft.com/kb/843147>, (Accessed Dec. 18, 2006), 5 pgs.
"German Application Serial No. 102013221052.3, Office Action dated Mar. 24, 2015", w/English Translation, 17 pgs.
"German Application Serial No. 102013221057.4, Office Action dated Mar. 23, 2015", w/ English Translation, 17 pgs.
"Great Britain Application Serial No. 1404574.4, Office Action dated Dec. 18, 2014".
"Java Remote Method Invocation: 7—Remote Object Activation", [Online]. Retrieved from the Internet: <URL: https://docs.oracle.com/javase/7/docs/platformirmi/spec/rmi-activation2.html, (accessed Dec. 31, 2010), 2 pgs.
"Machine Code", Wikipedia, [Online]. Retrieved from the Internet: <URL: http://en.wikipedia.org/wiki/Machine code>, (Accessed Aug. 11, 2014), 1-5.
"Netherlands Application Serial No. 2011613, Netherlands Search Report dated Aug. 13, 2015", W/ English Translation, 7 pgs.
"Netherlands Application Serial No. 2011627, Netherlands Search Report dated Aug. 14, 2015", W/ English Translation, 9 pgs.
"Netherlands Application Serial No. 2012437, Netherlands Search Report dated Sep. 18, 2015", W/ English Translation, 7 pgs.
"New Zealand Application Serial No. 616212, Notice of Allowance dated Jan. 23, 2015", 1 pg.
"New Zealand Application Serial No. 616299, Notice of Allowance dated Apr. 7, 2015", 1 pg.
"New Zealand Application Serial No. 616299, Office Action dated Jan. 26, 2015", 2 pgs.
"New Zealand Application Serial No. 622414, Office Action dated Mar. 24, 2014", 2 pgs.
"New Zealand Application Serial No. 622484, Office Action dated Apr. 2, 2014", 2 pgs.
"New Zealand Application Serial No. 622485, Notice of Allowance dated Nov. 24, 2014", 1 pg.
"New Zealand Application Serial No. 622485, Office Action dated Nov. 21, 2014", 1 pg.
"The FASTA Program Package", fasta-36.3.4, (Mar. 25, 2011), 1-29.
Alur, Nagraj, et al., "Chapter 2: IBM InfoSphere DataStage Stages", IBM InfoSphere DataStage Data Flow and Job Design, pp. 35-137, (Jul. 1, 2008), 106 pgs.
Bae, Jinuk, et al., "Partitioning Algorithms for the Computation of Average Iceberg Queries", DaWaK 2000, LNCS 1874, (2000), 276-286.
Ballesteros, Francisco, et al., "Batching: A Design Pattern for Efficient and Flexible Client/Server Interaction", Transaction on Pattern Language of Programming I, (c) Springer-Verlag Berlin Heidelberg 2009, (2009), 48-66.
Bogle, Phillip, et al., "Reducing Cross Domain Call Overhead Using Batched Futures", SIGPLAN No. 29, 10, OOPSLA ' 94, (Oct. 1994), 341-354.
Bogle, Phillip, "Reducing Cross-Domain Call Overhead Using Batched Futures (Submitted to the Dept. of Electrical Engineering and Computer Science in partial fulfillment of the requirement for the degree of Master of Science in Computer Science and Engineering)", Massachusetts Institute of Technology, (1994), 1-96.
Bouajjani, Ahmed, et al., "Analysis of Recursively Parallel Programs", POPL'12, (Jan. 2012), 203-214.
Canese, Kathi, et al., "Chapter 2: PubMed: The Bibliographic Database", The NCBI Handbook, (Oct. 2002), 1-10.
Chazelle, Bernard, et al., "The Bloomier Filter: An Efficient Data Structure for Static Support Lookup Tables", SODA '04 Proceedings of the Fifteenth Annual ACMSIAM Symposium on Discrete Algorithms, (2004), 30-39.
Delcher, Arthur, et al., "Identifying Bacterial Genes and Endosymbiont DNA with Glimmer", BioInformatics, vol. 23, No. 6, (2007), 673-679.
Donjerkovic, Donko, et al., "Probabilistic Optimization of Top N Queries", Proceedings of the 25th VLDB Conference, (1999), 411-422.
Fang, Min, et al., "Computing Iceberg Queries Efficiently", Proceedings of the 24th VLDB Conference, (1998), 299-310.
Goldstein, Seth Copen, et al., "Stacks Lazy Threads: Implementing a Fast Parallel Call", Journal of Parallel and Distributed Computing, (Jan. 1996), 5-20.
Han, Jiawei, et al., "Efficient Computation of Iceberg Cubes with Complex Measures", ACM Sigmod (May 21-24, 2001), 1-12.
Ivanova, Milena, et al., "An Architecture for Recycling Intermediates in a Column-store", Proceedings of the 35th Sigmod International Conference on Management of Data, SIGMOD '09, (Jun. 29, 2009), 309-320.
Jacques, Mathieu, "An Extensible Math Expression Parser with Plug-ins—Code Project", [Online]. Retrieved from the Internet: <URL: http://www.codeproject.com/Articles/7335/An-extensible-math-expression-parser-with-plug-ins>, (Mar. 13, 2008), 1-34.
Jenks, Stephen, et al., "Nomadic Threads: A Migrating Multithreaded Approach to Remote Memory Accesses in Multiprocessors", Parallel Architectures and Compilation Techniques, (Oct. 1996), 2-11.
Kahan, J., et al., "Annotea: An open RDF Infrastructure for Shared Web Annotations", Computer Networks vol. 39, No. 5, (2002), 589-608.
Karp, Richard, et al., "A Simple Algorithm for Finding Frequent elements in Streams and Bags", ACM Transactions on Database Systems, vol. 28, No. 1, (Mar. 2003), 51-55.
Kitts, Paul, "Chapter 14: Genome Assembly and Annotation Process", The NCBI Handbook, (Oct. 2002), 1-21.
Leela, Krishna P, et al., "On Incorporating Iceberg Queries in Query Processors", Lecture Notes in Computer Science: Database Systems for Advanced Applications, vol. 2973, Springer Berlin Heidelberg, (2004), 431-442.
Liu, Hongyan, et al., "Methods for Mining Frequent Items in Data Streams: An Overview", Knowledge and Information Systems, vol. 26, No. 1, (Jan. 2011), 1-30.
Madden, "Chapter 16: BLAST Sequence Analysis Tool", The NCBI Handbook, (Oct. 2002), 1-15.

(56) References Cited

OTHER PUBLICATIONS

Mendes, Pablo, et al., "TcruziKB: Enabling Complex Queries for Genomic Data Exploration", IEEE International Conference on Semantic Computing, (Aug. 2008), 432-439.

Mizrachi, Ilene, "Chapter 1: GenBank: The Nucleotide Sequence Database", The NCBI Handbook, (Oct. 2002), 1-14.

Plasil, Frantisek, "An Architectural View of Distributed Objects and Components in Corba, Java RMI and COM/DCOM", Software—Concepts & Tools, vol. 19, No. 1, (Jun. 1998), 14-28.

Russell, Alastair, et al., "NITELIGHT: A Graphical Tool for Semantic Query Construction", University of Southhampton, UK, (2008), 1-10.

Sigrist, Christian, et al., "PROSITE, a Protein Domain Database for Functional Characterization and Annotation", Nucleic Acids Research, vol. 38, (2010), D161-D166.

Sirotkin, Karl, et al., "Chapter 13: The Processing of Biological Sequence Data at NCBI", The NCBI Handbook, (Oct. 2002), 1-11.

Smart, Paul, et al., "A Visual Approach to Semantic Query Design Using a Web-Based Graphical Query Designer", 16th International Conference on Knowledge Engineering and Knowledge Management (EKAW), (2008), 16 pgs.

Stamos, James, et al., "Remote Evaluation", ACM Transactions on Programming Languages and Systems, vol. 12, No. 4, (Oct. 1990), 537-565.

Wollrath, Ann, et al., "A Distributed Object Model for the Java System", Proceedings of the 2nd Conference on USENEX, Conference on Object-Orients Technologies and Systems, (Jun. 1996), 219-231.

"U.S. Appl. No. 15/484,983, First Action Interview Pre-Interview Communication dated Nov. 6, 2017", 25 pgs.

"U.S. Appl. No. 15/901,736, Final Office Action dated Jun. 26, 2019", 12 pgs.

"U.S. Appl. No. 15/901,736, Non Final Office Action dated Dec. 17, 2018", 12 pgs.

"Data Validation", Retrieved from the Internet: <URL: https://web.archive.org/web/20150707145954/http://xlsgen.arstdesign.com/core/picklists.html>, (Jul. 7, 2015).

"European Application Serial No. 17185144.7, Extended European Search Report dated Oct. 20, 2017", 9 pgs.

"European Application Serial No. 18166684.3, Notification of European Search Report dated May 25, 2018", 11 pgs.

"European Application Serial No. 18166684.3, Notification of European Publication Number dated Sep. 19, 2018", 2 pgs.

Jones, Steve, "Graphical Query Specification and Dynamic Result Previews for a Digital Library", UIST '98. 11th Annual Symposium on User Interface Software and Technology. Proceedings of the ACM Symposium on User Interface Software and Technology San. Francisco, CA Nov. 1-4, 1998, (1998), 143-151.

MacDonald, Matthew, et al., "Pro ASP.NET in C# 2010", Fourth Edition—Chapter 8, pp. 321-352, (2010), 34 pgs.

U.S. Appl. No. 16/541,524, filed Aug. 15, 2019, Collaborative Spreadsheet Data Validation and Integration.

* cited by examiner

| # | Name | ID Number | Location Type | Rating | MGRS | F | G | H |
|---|---|---|---|---|---|---|---|---|
| 1 | 643 | 165555-12 | Coffee Shop | Bad | 10SEG74124430 | | | |
| 2 | 644 | 165555-13 | Deli | Very Good | 26GMB425761 | | | |
| 3 | 645 | 165555-14 | Cafe | Very Bad | 26GMB718635 | | | |
| 4 | 646 | 165555-15 | Cafe | Bad | 12FQU602650 | | | |
| 5 | 647 | 165555-16 | Cafe | Very Good | 26GMB434867 | | | |
| 6 | 648 | 165555-14 | Cafe | Very Bad | 26GMB449877 | | | |
| 7 | 649 | 165555-18 | Cafe | Good | 26GMB360896 | | | |
| 8 | 650 | 165555-14 | Cafe | Bad | 26GMB495936 | | | |
| 9 | 651 | 165555-20 | Cafe | Very Good | 26GMB499957 | | | |
| 10 | 652 | 165555-21 | Cafe | Very Bad | 26GMB365913 | | | |
| 11 | 653 | 165555-22 | Cafe | Bad | 26GMB445849 | | | |
| 12 | 654 | 165555-23 | Bar | Very Good | 26GMA465940 | | | |
| 13 | 655 | 165555-24 | Bar | Very Bad | 26GME451284 | | | |
| 14 | 656 | 165555-25 | Bar | Good | 26GMC788541 | | | |
| 15 | 657 | 165555-26 | Bar | Good | 26GNC507339 | | | |
| 16 | 658 | 165555-27 | Coffee Shop | Bad | 26GLB422992 | | | |
| 14 | 659 | 165555-28 | Coffee Shop | Very Good | 26GLB578968 | | | |
| 18 | 660 | 165555-29 | Coffee Shop | Very Bad | 26GLC589301 | | | |
| 14 | 661 | 165555-30 | Coffee Shop | Bad | 26GLB066952 | | | |
| 20 | 662 | 165555-31 | Coffee Shop | Very Good | 12FMA935390 | | | |
| 21 | 663 | 165555-32 | Coffee Shop | Very Bad | 26GNA773969 | | | |
| 22 | 664 | 165555-33 | Cafe | Good | 12FPV146353 | | | |
| 23 | 665 | 165555-34 | Cafe | Bad | 12FNV262637 | | | |
| 24 | 666 | 165555-35 | Cafe | Very Good | 12FQA031239 | | | |
| 25 | 667 | 165555-36 | Cafe | Very Bad | 12FMA370387 | | | |
| 26 | 668 | 165555-37 | Cafe | Bad | 12FMA370387 | | | |
| 27 | 669 | 165555-38 | Cafe | Very Good | 12FQU705769 | | | |
| 28 | 670 | 165555-39 | Bar | Very Bad | 12FQU730769 | | | |
| 29 | 671 | 165555-40 | Bar | Good | 12FQU705769 | | | |
| 30 | 672 | 165555-41 | Cafe | Bad | 12FQU730769 | | | |
| 31 | 673 | 165555-42 | Cafe | Very Good | 12FQU705769 | | | |
| 32 | 674 | 165555-43 | Cafe | Very Bad | 12FQU705769 | | | |
| 33 | 675 | 165555-44 | Cafe | Bad | 26GMB320921 | | | |

Synced  0  ⊙

Back up History                    ✕

- Current Version
- Backup - 15:05:30 2/7/12
- Backup - 15:05:30 2/7/12 Recover
- Backup - 15:05:30 2/7/12
- Backup - 15:05:30 2/7/12
- Backup - 15:05:30 2/7/12
- Backup - 15:05:30 2/7/12
- Backup - 15:05:30 2/7/12
- Backup - 15:05:30 2/7/12
- Backup - 15:05:30 2/7/12

| # | Name | ID Number | Location Type | Rating | MGRS |
|---|---|---|---|---|---|
| 1 | 643 | 165555-12 | Coffee Shop | Bad | 10SEG74 |
| 2 | 644 | 165555-13 | Deli | Very Good | 26GMB42 |
| 3 | 645 | 165555-14 | Cafe | Very Bad | 26GMB71 |
| 4 | 646 | 165555-15 | Cafe | Bad | 12FQU60 |
| 5 | 647 | 165555-16 | Cafe | Very Good | 26GMB43 |
| 6 | 648 | 165555-14 | Cafe | Very Bad | 26GMB449877 |
| 7 | 649 | 165555-18 | Cafe | Good | 26GMB360896 |
| 8 | 650 | 165555-14 | Cafe | Bad | 26GMB495936 |
| 9 | 651 | 165555-20 | Cafe | Very Good | 26GMB499957 |
| 10 | 652 | 165555-21 | Cafe | Very Bad | 26GMB365913 |
| 11 | 653 | 165555-22 | Cafe | Bad | 26GMB445849 |
| 12 | 654 | 165555-23 | Bar | Very Good | 26GMA465940 |
| 13 | 655 | 165555-24 | Bar | Very Bad | 26GME451284 |
| 14 | 656 | 165555-25 | Bar | Good | 26GMC788541 |
| 15 | 657 | 165555-26 | Bar | Good | 26GNC507339 |
| 16 | 658 | 165555-27 | Coffee Shop | Bad | 26GLB422992 |
| 14 | 659 | 165555-28 | Coffee Shop | Very Good | 26GLB578968 |
| 18 | 660 | 165555-29 | Coffee Shop | Very Bad | 26GLC589301 |
| 14 | 661 | 165555-30 | Coffee Shop | Bad | 26GLB066952 |
| 20 | 662 | 165555-31 | Coffee Shop | Very Good | 12FMA935390 |
| 21 | 663 | 165555-32 | Coffee Shop | Very Bad | 26GNA773969 |
| 22 | 664 | 165555-33 | Cafe | Good | 12FPV146353 |
| 23 | 665 | 165555-34 | Cafe | Bad | 12FNV262637 |
| 24 | 666 | 165555-35 | Cafe | Very Good | 12FQA031239 |
| 25 | 667 | 165555-36 | Cafe | Very Bad | 12FMA370387 |
| 26 | 668 | 165555-37 | Cafe | Bad | 12FMA370387 |
| 27 | 669 | 165555-38 | Cafe | Very Good | 12FQU705769 |
| 28 | 670 | 165555-39 | Bar | Very Bad | 12FQU730769 |
| 29 | 671 | 165555-40 | Bar | Good | 12FQU705769 |
| 30 | 672 | 165555-41 | Cafe | Bad | 12FQU730769 |
| 31 | 673 | 165555-42 | Cafe | Very Good | 12FQU705769 |
| 32 | 674 | 165555-43 | Cafe | Very Bad | 12FQU705769 |
| 33 | 675 | 165555-44 | Cafe | Bad | 26GMB320921 |

Application Access

Map ⊘ Not Synced Requires MGRS rule or Latitude and Longitude rules.

Share data with other apps and sheets

Optional: Map Title

| Case Number | Country Name | Author |
|---|---|---|
| ISP-1234 | USA | Bob |
| ISP-321 | Texas | Must match value in Countries : Table Name |
| ISP-12332 | Canada | Alex |

FIG. 12

COLLABORATIVE SPREADSHEET DATA VALIDATION AND INTEGRATION

PRIORITY APPLICATION

This application claims priority to U.S. Provisional Application Ser. No. 62/373,615, filed Aug. 11, 2016, the disclosure of which is incorporated herein in its entirety by reference.

TECHNICAL FIELD

The present disclosure generally relates to the technical field of special-purpose machines that facilitate integration of spreadsheet data including computerized variants of such special-purpose machines and improvements to such variants, and to the technologies by which such special-purpose machines become improved compared to other special-purpose machines that facilitate integration of spreadsheet data. In particular, the present disclosure addresses systems and methods for collaborative spreadsheet data entry, validation, and integration into one or more network applications.

BACKGROUND

Traditional spreadsheet applications such as Microsoft® Excel® are frequently used to collect many different kinds of data as they are convenient tools for ad hoc data-entry. However, such traditional spreadsheet tools are not conducive for use in collaborative environments. For example, with traditional spreadsheet tools it is difficult for multiple users to collaborate on a single spreadsheet because if one user has the spreadsheet open, other users will be unable to open it. Another problem with traditional spreadsheets occurs in scenarios where multiple people are collaborating on multiple spreadsheets and the data schema used varies across groups and across spreadsheets. This may create an issue if the spreadsheets are being merged because a user must manually munge the spreadsheets together so they are in a uniform schema. An additional problem with traditional spreadsheets is that if data is being gathered using a spreadsheet and it is gathered to perform an analysis, the analysis is likely to be out of date because the data is just a snapshot from when it is collected. Once the spreadsheet is updated in the field, a delay is introduced in the analysis because the user tasked with performing the analysis must wait until the updated data is collected to make the analysis "live." Meanwhile, the data may again be updated in the field thereby rendering the analysis to be outdated.

BRIEF DESCRIPTION OF THE DRAWINGS

Various ones of the appended drawings merely illustrate example embodiments of the present inventive subject matter and cannot be considered as limiting its scope.

FIGS. 8A-8C are interface diagrams illustrating various aspects of user interfaces provided by the collaboration platform, according to some embodiments.

FIGS. 11A-1F are interface diagrams illustrating various aspects of user interfaces provided by the collaboration platform, according to some embodiments.

FIGS. 12-13 are interface diagrams illustrating various aspects of user interfaces provided by the collaboration platform, according to some embodiments.

DETAILED DESCRIPTION

Figure 1:
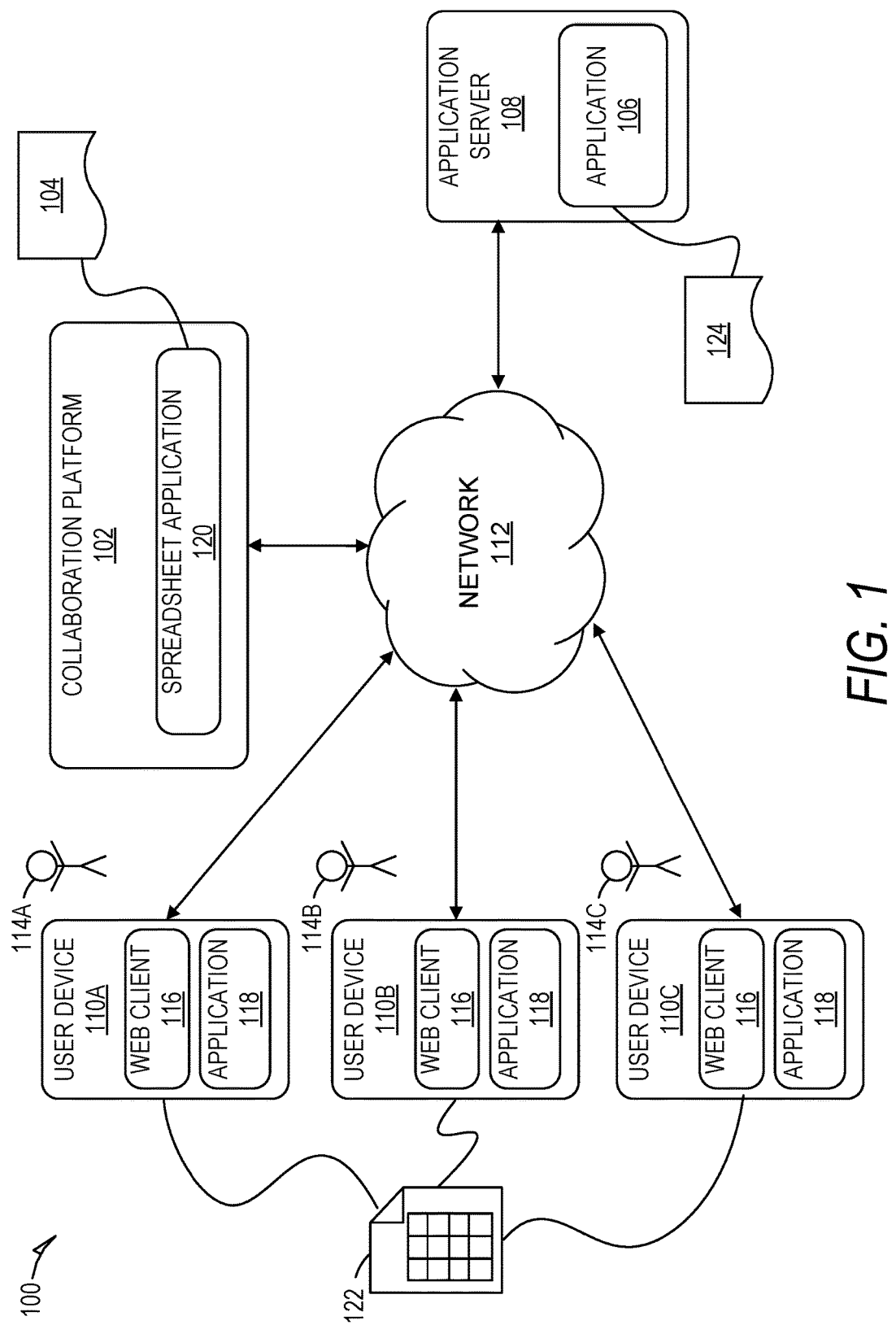
FIG. 1 is a network diagram illustrating a network system comprising a collaboration platform configured to integrate spreadsheet data with a network-based application, according to some embodiments.

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

As noted above, with traditional spreadsheet applications it is difficult for multiple users to collaborate on a single file (e.g., a spreadsheet), it is difficult to enforce "clean" data entry, and the periodic analysis quickly becomes outdated. To address the foregoing problems (among others) with traditional systems, aspects of the present disclosure include a system and methods for collaborative spreadsheet data entry, validation, and integration into one or more network applications. The inventive subject matter may find particular application in workflows where multiple users continually record data in spreadsheets and periodically create an analysis from this data, although it shall be appreciated that the inventive subject matter is not limited to application in such workflows, and the inventive subject matter may find equal application in other workflows and scenarios.

With reference to the live collaboration aspect, multiple users may edit a single spreadsheet simultaneously. With reference to data validation, users may create schemas with one or more validation rules that the system enforces to ensure clean data entry. For example, as a rule, a user may specify that a particular column in a spreadsheet includes dates, and the system verifies that data enter into the column includes a valid date. As part of the data validation feature, a helper widget may be provided to assist users in entering data that conforms to the specified schema. Following the above example, the helper widget for a date column may include a date picker to ensure users enter a date into the column. Additionally, the data validation aspect provides a guarantee for the schema on the backend (e.g., the backend knows the column has a date).

With reference to the data integration aspect, data entered into the spreadsheet may be easily integrated into other applications and services for live analysis. In this way, the data used by the other applications will be the most recently entered data. Further, spreadsheet data will only be synchronized with applications if the spreadsheet schema matches the schema used by the corresponding application. In instances in which the two schemas do not match, users may add additional rules to the spreadsheet to ensure compliance and proper synchronization.

In an example, the system allows users to collaborate on a spreadsheet to record locations they want to see plotted on a map using a network-based mapping application. In this example, the system may validate data entered into the spreadsheet (e.g., locations) against a set of validation rules that corresponds to a data schema used by the network-based mapping application and, responsive to determining the set of validation rules matches an application data schema used by the network-based map application, the system synchronizes spreadsheet data with application data consumed by the network-based mapping application thereby enabling the users to view locations plotted on a map by the network-based map application as users are entering the locations into the spreadsheet.

FIG. 1 is a network diagram depicting a network system 100 comprising a collaboration platform 102 configured to integrate spreadsheet data 104 with a network-based application 106, according to some embodiments. As shown, the network system 100 includes the collaboration platform 102, an application server 108 hosting the network-based application 106, and user devices 110A-C, all communicatively coupled to each other via a network 112. In an example, the collaboration platform 102 shown in FIG. 1 employs a client-server architecture to exchange data with the user devices 110A-C, although the present inventive subject matter is, of course, not limited to such an architecture, and could equally well find application in an event-driven, distributed, or peer-to-peer architecture system, for example. Moreover, it shall be appreciated that although some of the functional components of the network system 100 are discussed in the singular sense, multiple instances of one or more of the various functional components may be employed.

Also shown in FIG. 1 are users 114A-C, who may be human users (e.g., human beings), machine users (e.g., computers configured by a software program to interact with the device 110), or any suitable combination thereof (e.g., a human assisted by a machine or a machine supervised by a human). The users 114A-C are respectively associated with the user devices 110A-C and may be users of such devices. For example, the user devices 110A-C may be any one of a desktop computer, a tablet computer, a smart phone, or a wearable device (e.g., a smart watch or smart glasses) belonging to any one of the users 114A-C.

The user devices 110A-C may also include any one of a web client 116 (e.g., a web browser) or application 118 to facilitate communication and interaction between the user device 110 and the collaboration platform 102. In various embodiments, information communicated between the collaboration platform 102 and the user device 110 may involve user-selected functions available through one or more user interfaces (UIs). Accordingly, during a communication session with any one of the user devices 110A-C, the collaboration platform 102 may provide a set of machine-readable instructions that, when interpreted by the user devices 110A-C using the web client 116 or the application 118, cause the user devices 110A-C to present the UI, and transmit user input received through such a UI back to the collaboration platform 102.

The collaboration platform 102 may be implemented in a special-purpose (e.g., specialized) computer system, in whole or in part, as described below. The collaboration platform 102 includes a spreadsheet application 120 designed for continual collection of human-created data. More specifically, the spreadsheet application 120 includes a front end that allows the users 114A-C to interact with a spreadsheet 122 using either the web client 116 or the application 118, and a backend that drives a view of the spreadsheet 122 and maintains a canonical version of the spreadsheet data 104 that is created. In this example, the spreadsheet 122 is a live representation of the spreadsheet data 104 maintained by the spreadsheet application 120. The spreadsheet data 104 is stored in a data store (e.g., a computer-readable storage device) that forms part of, or is communicatively coupled to, the collaboration platform 102. The collaboration platform 102 may further maintain one or more historical versions of the spreadsheet data 104 to enable the users 114A-C to restore the spreadsheet 122 to a prior version.

Additionally, the spreadsheet application 120 allows the users 114A-C to create validation rules associated with the spreadsheet 122. Each validation rule includes a constraint that limits or controls what the users 114 can enter into at least one cell of the spreadsheet 122, and each is typically, but not necessarily always, associated with entire columns in the spreadsheet 122.

The spreadsheet application 120 is also responsible for synchronizing the spreadsheet data 104 with application data 124 consumed (e.g., used) by the application 106 hosted by the application server 108. The application 106 may configure the application server 108 to provide any number of network-based services that consume application data 124 to provide data manipulation, presentation, communication, or other capabilities to the users 114A-C or other users.

The network 112 may be any network that enables communication between or among systems, machines, databases, and devices (e.g., between collaboration platform 102 and the devices 110A-C). Accordingly, the network 112 may be a wired network, a wireless network (e.g., a mobile or cellular network), or any suitable combination thereof. The network 112 may include one or more portions that constitute a private network, a public network (e.g., the Internet), or any suitable combination thereof. Accordingly, the network 112 may include one or more portions that incorporate a local area network (LAN), a wide area network (WAN), the Internet, a mobile telephone network (e.g., a cellular network), a wired telephone network (e.g., a plain old telephone system (POTS) network), a wireless data network (e.g., a WiFi network or WiMax network), or any suitable combination thereof. Any one or more portions of the network 112 may communicate information via a transmission medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

Figure 2:
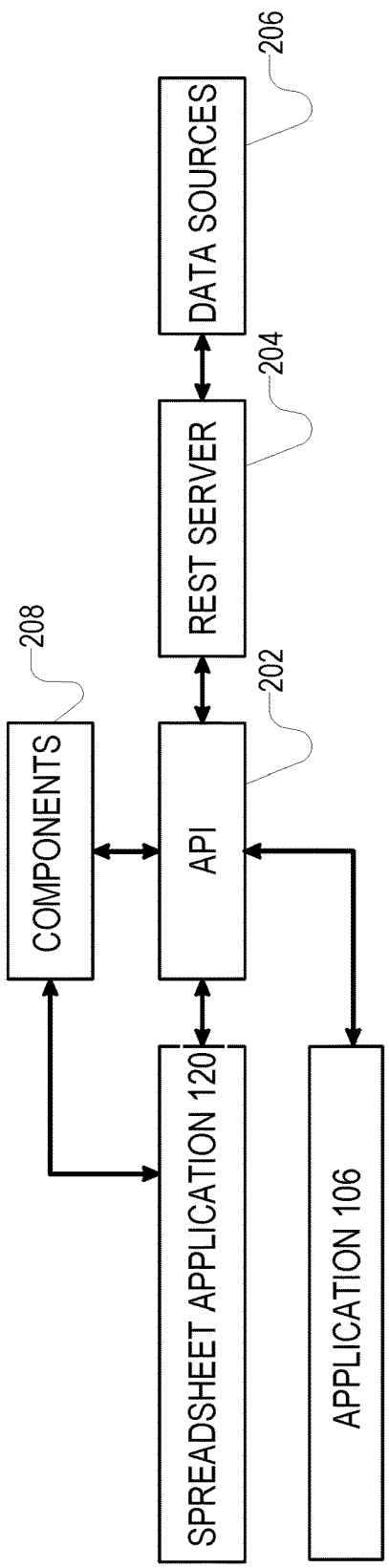
FIG. 2 is an architecture diagram illustrating a structure of the network system, according to some embodiments.

FIG. 2 is an architecture diagram illustrating a structure of the network system 100, according to some embodiments. As shown in FIG. 2, the collaboration platform 102 and the application 106 may interact, via an application programming interface (API) 202, with a representational state transfer (REST) server 204 to synchronize the spreadsheet data 104 with the application data 124 consumed by the application 106 (e.g., application data 124). For example, the spreadsheet application 120 may communicate, via the API 202, with the REST server 204 to integrate the spreadsheet data 104 with data sources 206 that include one or more data repositories (e.g., databases) that provide data to the application 106. Likewise, the application 106 may communicate, via the API 202, with the REST server 204 to integrate changes to the application data 124 with the data sources 206, which may, in turn, be consumed by the spreadsheet application 120. Additionally, the collaboration platform 102 and the application 106 are in communication with one or more components 208 that provide additional functionality to the collaboration platform 102 and the application 106 related to data included in the data sources 206. For example, the one or more components 208 may provide a data object viewer, a document viewer, search templates, ontology chooser, or an investigation bar to the users 114A-C of either the spreadsheet application 120 or the application 106.

Figure 3:
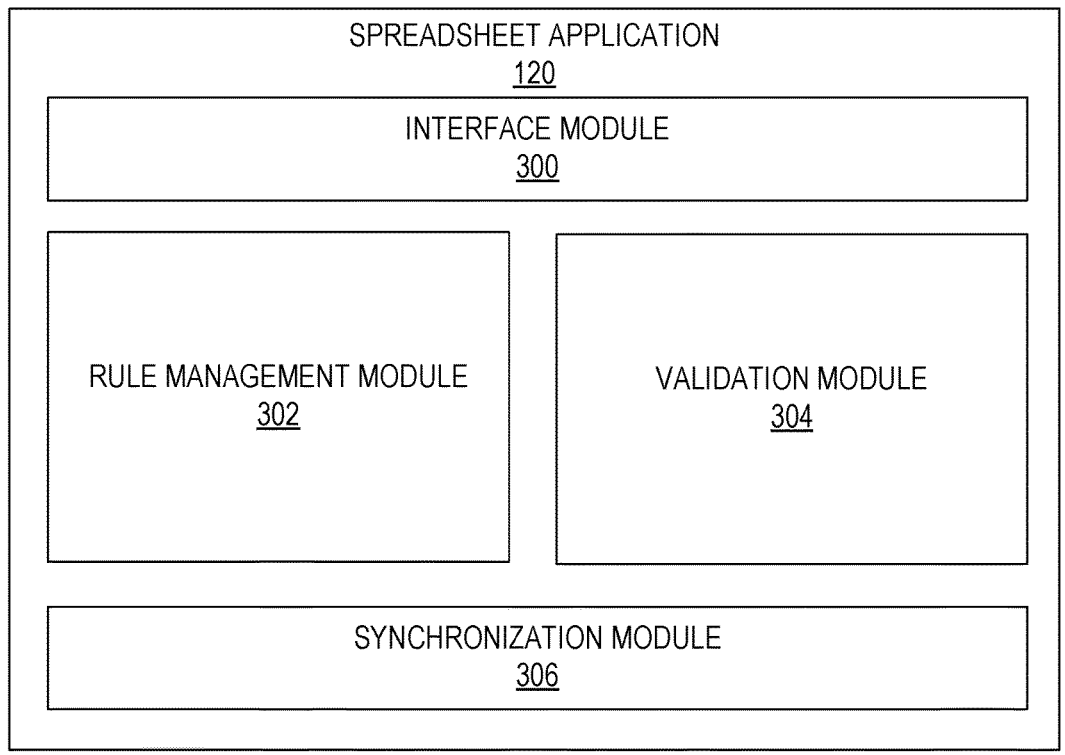
FIG. 3 is a system diagram illustrating various functional components of a spreadsheet application, which is provided as part of the collaboration platform, according to some embodiments.

FIG. 3 is a system diagram illustrating various functional components of the spreadsheet application 120, according to some embodiments. To avoid obscuring the inventive subject matter with unnecessary detail, various functional components (e.g., modules, engines, and databases) that are not germane to conveying an understanding of the inventive subject matter have been omitted from FIG. 3. However, a skilled artisan will readily recognize that various additional functional components may be supported by the spreadsheet application 120 to facilitate additional functionality that is not specifically described herein. As shown, the spreadsheet application 120 includes: an interface module 300; a rule management module 302; a validation module 304; and a synchronization module 306. Each of the above referenced functional components of the spreadsheet application 120 are configured to communicate with each other (e.g., via a bus, shared memory, a switch, or application programming interfaces (APIs) 202).

The interface module 300 receives requests from the user devices 110A-C, and communicates appropriate responses to the user devices 110A-C. The interface module 300 may receive requests from devices in the form of hypertext transfer protocol (HTTP) requests or other web-based, API requests. For example, the interface module 300 provides a number of interfaces (e.g., APIs 202) that allow data to be exchanged between the user devices 110A-C and the collaboration platform 102.

The interface module 300 also provides UIs to the user devices 110A-C that allow the users 114A-C to view and interact with the spreadsheet 122. To provide a UI to one of the user devices 110A-C, the interface module 300 transmits a set of machine-readable instructions to the user device 110 that causes the user device 110 to present the UI on a display of the user device 110. The set of machine-readable instructions may, for example, include presentation data (e.g., representing various elements of the UI), the spreadsheet data 104, and a set of instructions to display the presentation data. The receiving device (e.g., one of the user devices 110A-C) may temporarily store the presentation data and the spreadsheet data 104 to enable display of the UI and interaction with the spreadsheet 122 from within the UI.

The UIs provided by the interface module 300 may also include various input control elements (e.g., sliders, buttons, drop-down menus, check-boxes, and data entry fields) that allow the users 114A-C to specify various inputs such as updates to cells of the spreadsheet 122 or validation rules associated with the spreadsheet 122. The interface module 300 receives and processes user input received through such input control elements, and in some instances, the interface module 300 may update the spreadsheet data 104 in accordance with the received input (e.g., the interface module 300 updates the spreadsheet data 104 in accordance with edits made to the spreadsheet 122 by any one of the users 114A-C). Examples of the UIs provided by the interface module 300 are discussed below in reference to FIGS. 8-13.

The rule management module 302 is responsible for managing validation rules associated with the spreadsheet 122. Each validation rule includes a constraint on data entered into at least one cell of the spreadsheet 122, and in many cases, on all cells of an entire column. For example, a validation rule may constrain data entered into a column specifically to dates. In this example, any non-date entry entered into a cell of the spreadsheet will not conform to the validation rule.

The rule management module 302 allows the users 114A-C to add, edit, or delete validation rules associated with the spreadsheet 122. To this end, the rule management module 302 may work in conjunction with the interface module 300 to provide a rule management interface that allows the users 114A-C to view, add, edit, or delete validation rules. An example rule management interface is illustrated in FIGS. 11A-11F and described in further detail below, in accordance with some embodiments. Further, as will be described below in reference to FIG. 4, the rule management module 302 stores validation rules as part of a spreadsheet artifact, which corresponds to the spreadsheet data 104.

The validation module 304 is configured to validate the spreadsheet 122 according to one or more validation rules associated with the spreadsheet 122. In validating the spreadsheet 122, the validation module 304 compares information entered into each cell with any validation rules associated with the cell to determine whether the information entered into the cell conforms to the associated validation rules. In an example, a validation rule associated with the spreadsheet 122 specifies that only dates should be entered into a particular column. In this example, the validation module 304 checks whether the information entered into each cell of the column is a date.

Cells with entries that conform to the validation rules are considered to include valid entries, whereas cells with entries that do not conform to the validation rules are considered to include invalid entries. In response to determining that a cell includes an invalid entry, the validation module 304 works in conjunction with the interface module 300 to cause the cell with the invalid entry to be visually distinguished from cells with valid entries. For example, the cell with the invalid entry may be highlighted or otherwise displayed differently (e.g., in a different color, font, format, or style) from entries in the spreadsheet 122 that include valid entries. An example of how the interface module 300 visually distinguishes a cell is illustrated in FIG. 12 and discussed below in further detail in accordance with some embodiments.

The synchronization module 306 is configured to synchronize the spreadsheet data 104 and the application data 124. That is, the synchronization module 306 is responsible for ensuring that changes made to the spreadsheet data 104 are reflected in the application data 124, and that changes made to the application data 124 are reflected in the spreadsheet data 104. In synchronizing the spreadsheet data 104 with the application data 124, the synchronization module 306 may communicate, via the API 202, one or more requests to the REST server 204 to integrate the spreadsheet data 104 and any subsequent changes made thereto with the data sources 208 that supply the application data 124 to the application 106.

In many instances, the application 106 employs a particular application data schema that includes a set of constraints on the application data 124. For example, the application data schema for a map application may specify that the application data 124 be in the form of geo-coordinates (e.g., latitude and longitude, or military grid reference system (MGRS)). In these instances, the synchronization module 306 ensures that the validation rules associated with the spreadsheet 122 match the application data schema for the application 106 prior to synchronizing the spreadsheet data 104 with the application data 124. In other words, the synchronization module 306 compares the validation rules associated with the spreadsheet 122 to the application data schema to determine whether the validation rules include the set of constraints that are included in the application data schema. In this way, the synchronization module 306 ensures that the application 106 is not provided with invalid values that may lead to errors or other issues.

As is understood by skilled artisans in the relevant computer and Internet-related arts, each functional component (e.g., engine, module, or database) illustrated in FIG. 3 may be implemented using hardware (e.g., a processor of a machine) or a combination of logic (e.g., executable software instructions) and hardware (e.g., memory and processor of a machine) for executing the logic. Furthermore, the various functional components depicted in FIG. 3 may reside on a single machine (e.g., a server) or may be distributed across several machines in various arrangements such as cloud-based architectures. Moreover, any two or more of these components may be combined into a single component (e.g., a single module), and the functions described herein for a single component may be subdivided among multiple modules. Functional details of these modules are described below with respect to FIGS. 5-8.

Figure 4:
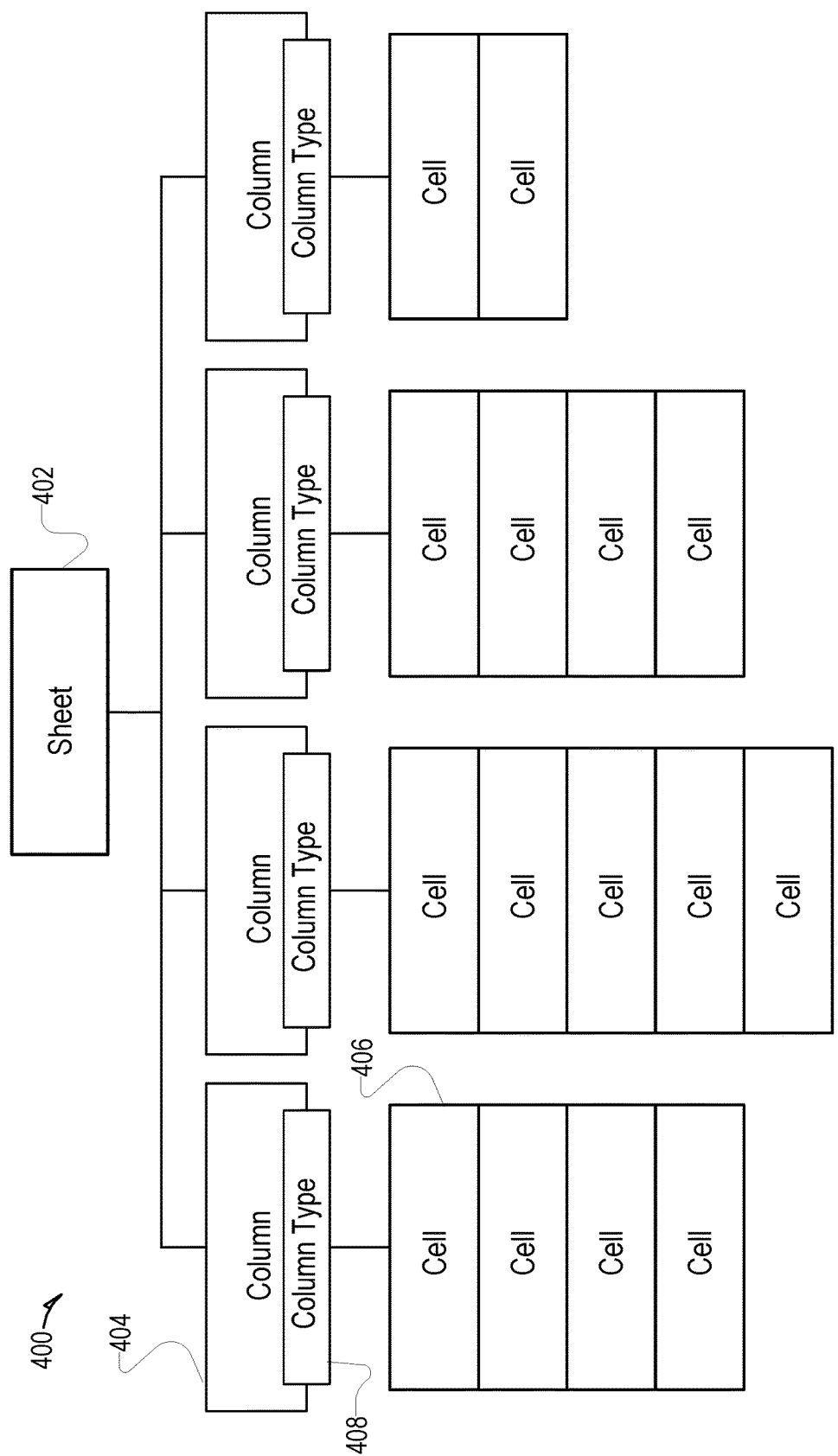
FIG. 4 is a data structure diagram illustrating a spreadsheet data object, according to some embodiments.

FIG. 4 is a data structure diagram illustrating a spreadsheet artifact 400, according to some embodiments. The spreadsheet artifact 400 is a tree data structure used by the collaboration platform 102 to represent spreadsheets. In an example, the spreadsheet artifact 400 is used to represent the spreadsheet 122 and corresponds to the spreadsheet data 104. As shown, the spreadsheet artifact 400 includes four different non-primitive data types that make up a spreadsheet state to be stored and shared. The element types include: sheet 402, column 404, cell 406, and column type 408. The sheet 402 includes a name, a creator name, and a list of columns in the spreadsheet. The column 404 includes a name and enumeration for type (e.g., date, text, file) along with one or more validation rules and a list of cells in the column. The cell 406 includes a value and lock information. The column type 408 includes an enumeration for type along with additional configuration information. Consistent with some embodiments, the column type 408 may be used for client side data validation.

Figure 5:
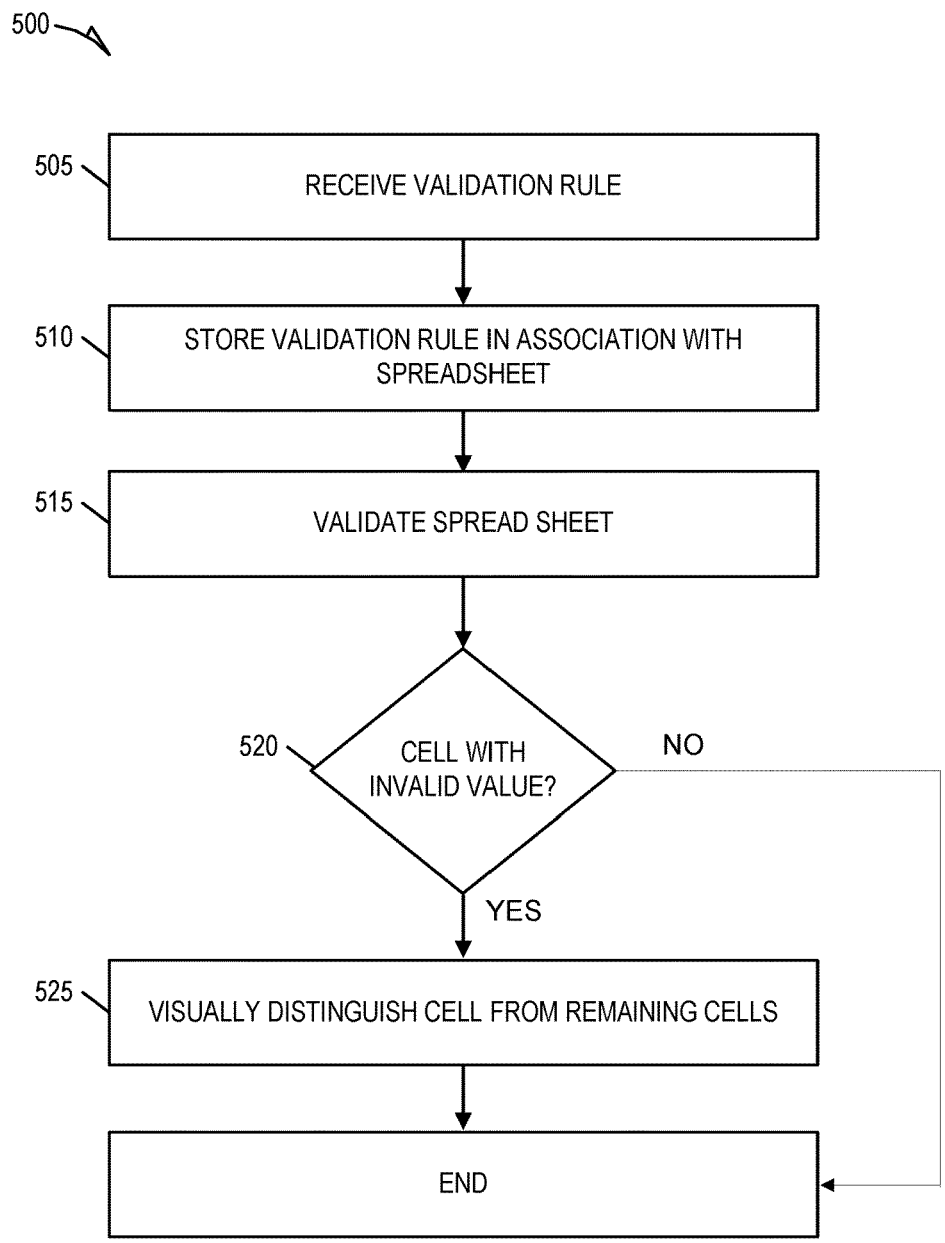
FIGS. 5-6 are flowcharts illustrating a method for validating a spreadsheet, according to some embodiments.
Figure 6:
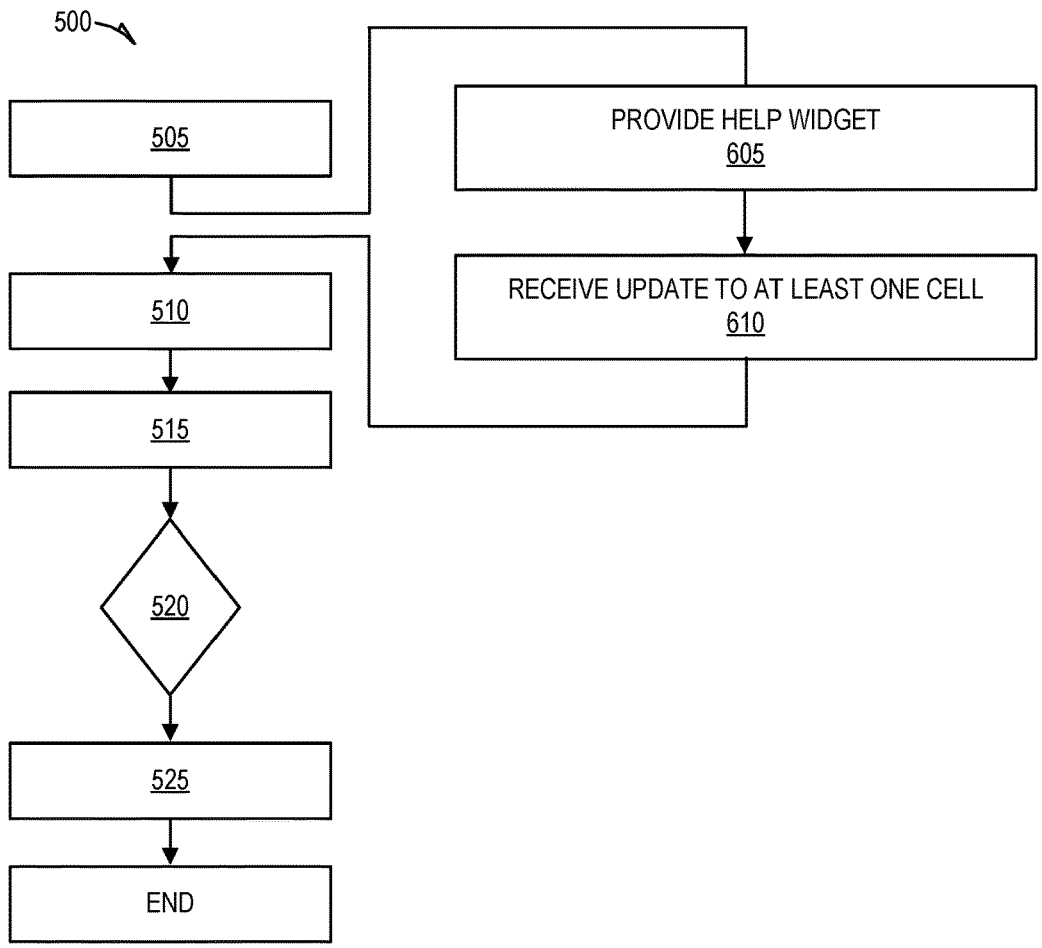

FIGS. 5-6 are flowcharts illustrating a method 500 for validating a spreadsheet, according to some embodiments. The method 500 may be embodied in computer-readable instructions for execution by one or more processors such that the operations of the method 500 may be performed in part or in whole by the collaboration platform 102; accordingly, the method 500 is described below by way of example with reference thereto. However, it shall be appreciated that at least some of the operations of the method 500 may be deployed on various other hardware configurations and the method 500 is not intended to be limited to the collaboration platform 102.

At operation 505, the rules management module 302 receives a validation rule associated with the spreadsheet 122. The validation rule may be specified by any one of the users 114A-C using a UI provided to one of the user devices 110A-C by the interface module 300. As noted above, the validation rule imposes a constraint on information the users 114A-C can enter into the cells 406 of a specific column of the spreadsheet 122.

The validation rule comprises validation logic and, optionally, one or more configuration parameters. The validation logic includes a name, a validator, and a value type. The interface module 300 provides user interface elements that allow the users 114A-C to specify the validation logic (e.g., name, validator, and value type) and the one or more configuration parameters. Accordingly, the receiving of the validation rule may include receiving user specified validation logic, and receiving one or more user specified configuration parameters.

At operation 510, the rules management module 302 stores the validation rule (e.g., in a computer-readable storage device forming part of or coupled to the collaboration platform 102) in association with the spreadsheet 122. In particular, the rules management module 302 stores the validation rule as part of the corresponding column 404 forming part of the spreadsheet artifact 400.

At operation 515, the validation module 304 validates the spreadsheet 122 according to validation rules associated with the spreadsheet 122 (e.g., the validation rule received at operation 505). In validating the spreadsheet 122 according to the validation rules, the validation module 304 checks each cell 406 to ensure that the value entered into the cell complies with a validation rule associated with the cell (e.g., a validation rule associated with the column in which the cell resides).

A value that does not comply with a corresponding validation rule is an invalid value. At operation 520, the validation module 304 determines whether the spreadsheet 122 includes a cell with an invalid value. If, at operation 520, the validation module 304 determines the spreadsheet 122 includes a cell with an invalid value, the method 500 proceeds to operation 520, where the validation module 304 works with the interface module 300 to cause the cell with the invalid value to be visually distinguished (e.g., highlight) compared to the of remainder of cells included in the presentation of the spreadsheet 122. If, at operation 520, the validation module 304 determines all cells include valid entries, the method 500 ends.

As shown in FIG. 6, the method 500 may include one or more of operations 605 and 610. As shown in FIG. 6, operation 605 may be performed after operation 505, in which the rules management module 302 receives a validation rule. At operation 605, the interface module 300 provides a help widget for display on the user devices 110A-C. The help widget comprises one or more input elements operable to enter values into one or more cells (e.g., cells of a particular column) through appropriate user interaction (e.g., a mouse click). For example, the help widget may be or include a date picker that allows the users 114A-C to select a date from an input element that resembles a calendar. In another example, the help widget may be or include a drop-down menu with a list of predefined selectable values. In yet another example, the help widget may be or include a geo-coordinate widget that allows users 114A-C to input a set of geo-coordinates (e.g., a longitude and latitude).

In providing the help widget, the interface module 300 may provide a set of computer-readable instructions to the user devices 110A-C that configure the user devices 110A-C to display and receive input from the help widget. As implied by the above referenced examples, the interface module 300 may be configured to provide various types of help widgets for inputting various types of information, and the type of help widget provided may be based on the validator included in the validation rule. For example, the interface module 300 may provide the date picker in response to the validation rule including a date validator, or a geo-coordinate widget in response to the validation rule including a coordinate validator.

At operation 610, the interface module 300 receives an update to one or more cells of the spreadsheet 122. The update may include a new value, a deleted value, or a modification (e.g., edit) to an existing value. The update may be made by one or more of the users 114A-C using the user devices 110A-C to either manually enter the update or to enter the update using the help widget. In an example, the update may include: a modification (e.g., a change to a value) made to a first cell of the spreadsheet 122 by the user 114A using the user device 110A; a first new value entered into a second cell of the spreadsheet 122 by the user 114B using the user device 110B; and a second new value entered into a third cell of the spreadsheet 122 by the user 114C using the user device 110C.

As shown in FIG. 6, operation 610 may be performed prior to operation 510, in which the validation module 304 validates the spreadsheet 122. Accordingly, the validating of the spreadsheet 122 in operation 510 may include validating the update to the one or more cells (e.g., new values or modified values) received in operation 610 according to the one or more validation rules associated with the spreadsheet 122.

Figure 7:
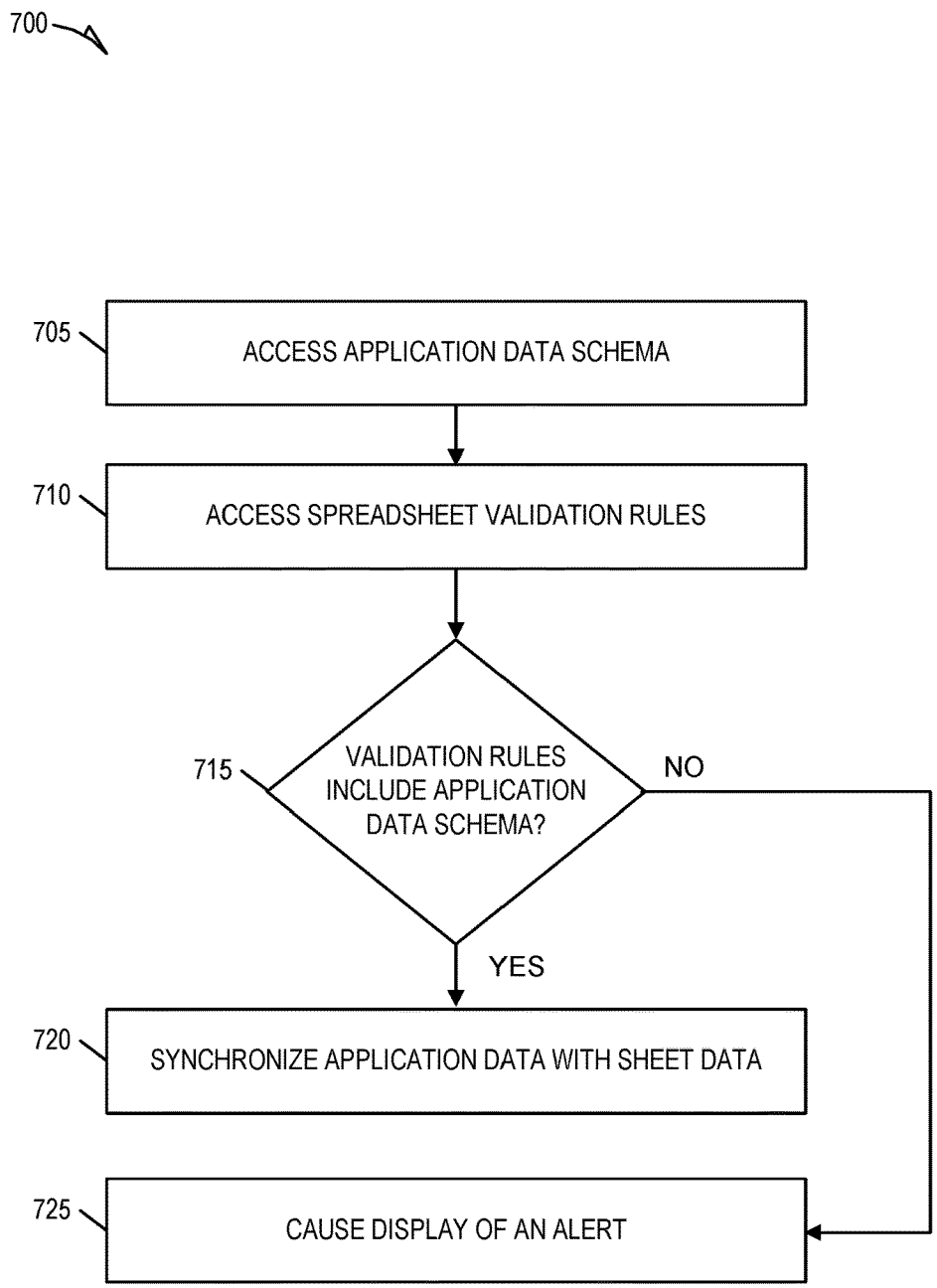
FIG. 7 is a flowchart illustrating a method for integrating spreadsheet data with a network-based application, according to some embodiments.

FIG. 7 is a flowchart illustrating a method 700 for integrating the spreadsheet data 104 with the application 106, according to some embodiments. The method 700 may be embodied in computer-readable instructions for execution by one or more processors such that the operations of the method 700 may be performed in part or in whole by the collaboration platform 102, accordingly, the method 700 is described below by way of example with reference thereto. However, it shall be appreciated that at least some of the operations of the method 700 may be deployed on various other hardware configurations and the method 700 is not intended to be limited to the collaboration platform 102. In some embodiments, the method 700 may be performed subsequent to the method 500, during which the collaboration platform 102 validates the spreadsheet data 104 and visually distinguishes any invalid entries in the spreadsheet 122.

At operation 705, the synchronization module 306 accesses an application data schema corresponding to the application 106 executing on the application server 108. The application data schema includes a set of constraints to control or limit the application data 124 consumed by the application 106 (e.g., input data provided to the application 106). In an example, the set of constraints limits the application data 124 to dates input in a particular form (e.g., MM/DD/YYYY). In another example, the set of constraints limits the application data 124 to geo-location coordinates (e.g., longitude and latitude or MSGR).

At operation 710, the synchronization module 306 accesses one or more validation rules associated with the spreadsheet 122. As noted above, the validation rules include constraints that limit or control information entered into the spreadsheet 122. The one or more validation rules may, for example, include the validation rule received at operation 505. In accessing the one or more validation rules, the synchronization module 306 may access the spreadsheet artifact 400 and identify the one or more validation rules from one or more columns 404 included in the spreadsheet artifact 400.

At operation 715, the synchronization module 306 determines whether the one or more validation rules associated with the spreadsheet 122 include the set of constraints included in the application data schema of the application 106. For example, if the application data schema limits the application data 124 consumed by the application 106 to dates, the synchronization module 306 checks one or more validation rules to determine whether they include a date validation rule limiting values entered into at least one column in the spreadsheet 122 to dates.

If, at operation 715, the synchronization module 306 determines the one or more validation rules associated with the spreadsheet 122 include the set of constraints, the synchronization module 306 synchronizes the spreadsheet data 104 with the application data 124, at operation 720. For example, the synchronization module 306 may communicate, via the API 202, one or more requests to the REST server 204 to integrate the spreadsheet data 104 and any subsequent updates made thereto (e.g., at operation 610) with the data sources 208 that supply the application data 124 to the application 106.

If, at operation 720, the synchronization module 306 determines the one or more validation rules associated with the spreadsheet 122 do not include the set of constraints, the spreadsheet data 104 is not synchronized with the application data 124, and the synchronization module 306 works in conjunction with the interface module 300 to cause an alert to be displayed within an interface element presented on at least one of the user devices 110A-C, at operation 725. The alert may include a notification that the spreadsheet data 104 and the application data 124 are not being synchronized, and may further list any additional validation rules that should be associated with the spreadsheet 122.

FIGS. 8-13 are interface diagrams illustrating various aspects of user interfaces provided by the collaboration platform 102, according to some embodiments. More specifically, each of the user interfaces illustrated in FIGS. 8-13 and discussed below may be provided by the interface module 300 and presented on a display unit of any of the user devices 110A-C. Further, the users 114A-C may interact with the user interfaces illustrated in FIGS. 8-13 as discussed below to perform live collaborations on spreadsheets and otherwise interact with the spreadsheet application 120 included as part of the collaboration platform 102.

Figure 8A:
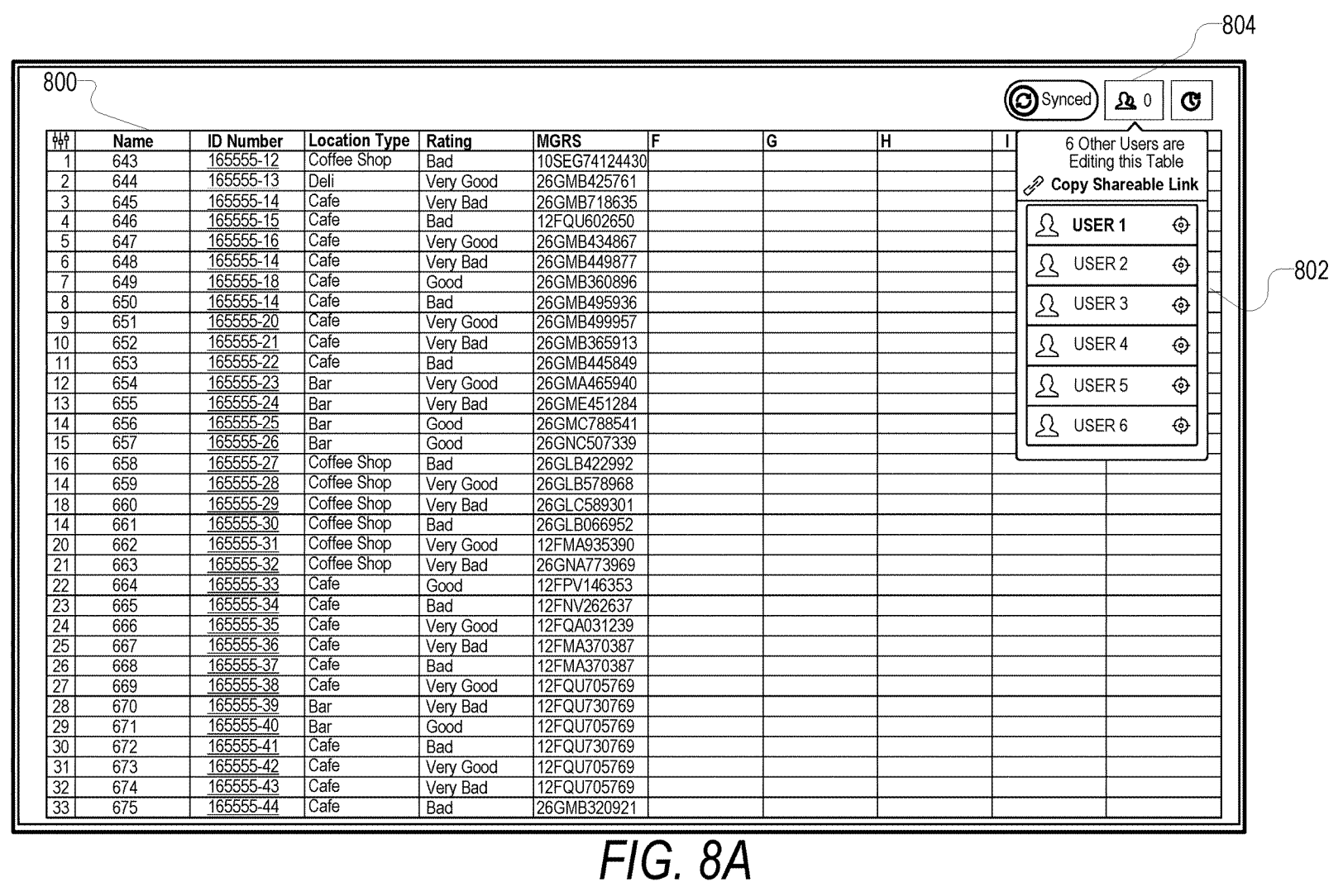

FIGS. 8A-8C are interface diagrams illustrating multiple views of an example spreadsheet 800, according to some embodiments. FIG. 8A illustrates a message box 802 being presented in conjunction with the spreadsheet 800. The message box 802 includes a list of users collaborating on the spreadsheet 800 (e.g., accessing and editing the spreadsheet 800). The list of users may include or correspond to the users 114A-C. Users may access the message box 802 through appropriate interaction with the button 804 (e.g., through selection using a mouse cursor).

FIG. 8B illustrates a version history dialog box 806 presented in conjunction with the spreadsheet 800. The version history dialog box 806 includes a list of historical versions (e.g., prior version) of the spreadsheet 800. A user selection of any one of the prior versions of the spreadsheet 800 causes the spreadsheet 800 to be reverted to the selected prior version of the spreadsheet 800. Users may access the version history dialog box 806 through appropriate interaction with a button 808 (e.g., through selection using a mouse cursor).

FIG. 8C illustrates a synchronization dialog box 810 presented in conjunction with the spreadsheet 800. The synchronization dialog box 810 presents information related to the synchronization of spreadsheet data corresponding to the spreadsheet 800 with application data of one or more network-based applications. In this example, the synchronization dialog box 810 includes information related to synchronization of the spreadsheet data with a map application. In particular, the synchronization dialog box 810 includes an alert with a notification that the spreadsheet 800 has not been synchronized with the application data of the map application, which, as discussed above, may be presented in response to determining the validation rules of the spreadsheet 800 do not include the application data schema of the map application. The synchronization dialog box 810 further includes a list of constraints included in the application data schema of the map application that may be included in the validation rules of the spreadsheet 800 to trigger synchronization.

The synchronization dialog box 810 also includes a toggle 812 that allows users to authorize the synchronization of the spreadsheet data of the spreadsheet 800 with application data of network-based applications. Further, users may access the synchronization dialog box 810 through appropriate interaction with the button 814 (e.g., through selection using a mouse cursor).

Figures 9, 10:
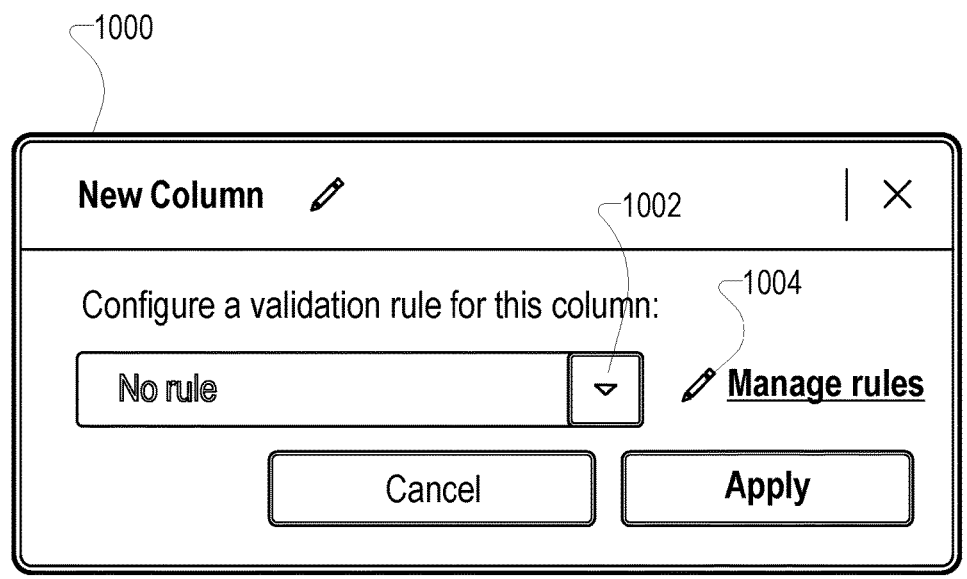
FIGS. 9-10 are interface diagrams illustrating various aspects of user interfaces provided by the collaboration platform, according to some embodiments.

FIG. 9 is an interface diagram illustrating a portion of an example spreadsheet 900, according to some embodiments. As shown, the name field of each column (e.g., the top most row) includes a button 902 that users may select to access a rules management interface from which users can view, edit, or add validation rules associated with the column. An example rules management interface is illustrated in FIGS. 11A-11F and described below in accordance with some embodiments.

FIG. 10 is an interface diagram illustrating a column creation window 1000, according to some embodiments. The column creation window 1000 may be used to add a column to a spreadsheet and to configure one or more validation rules for the column. For example, the drop-down list 1002 provides users with a list of predefined validation rules to select from. Additionally, the column creation window 1000 includes a button 1004 that users may select to access a rules management interface from which users can view, edit, or add validation rules associated with the column. An example rules management interface is illustrated in FIGS. 11A-11F and described below in accordance with some embodiments.

Figures 11A, 11B:
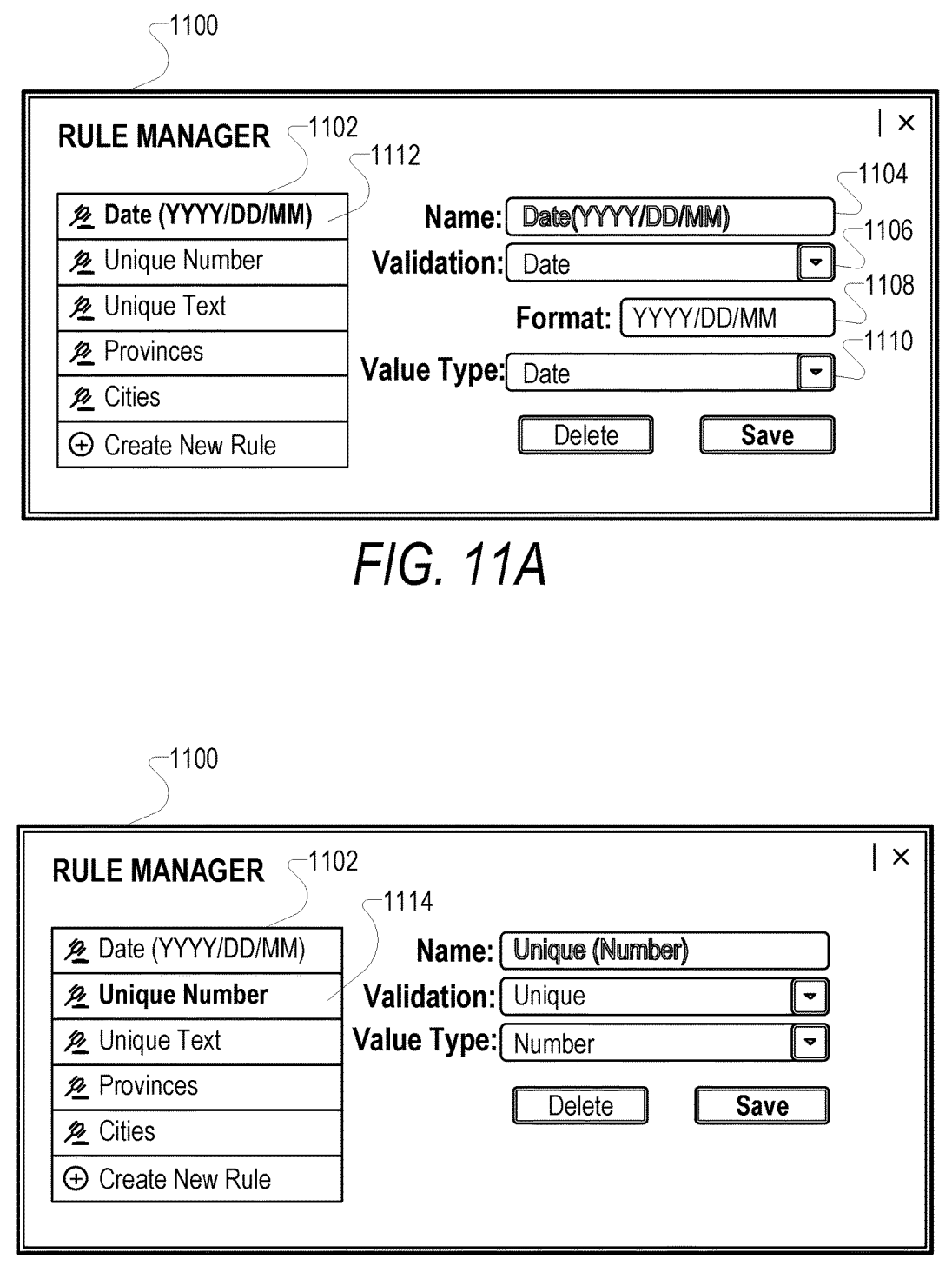

FIGS. 11A-1F are interface diagrams illustrating a rules management interface 1100 configured for viewing, editing, and creating validation rules associated with a spreadsheet (e.g., spreadsheet 122 or 800), according to some embodiments. As shown, in FIG. 11A the rules management interface 1100 includes a list box 1102 comprising a list of predefined validation rules from which users may select a validation rule to view and edit the validation logic along with any configuration parameters. Accordingly, the rules management interface 1100 includes a number of input controls (e.g., selectable drop-down menus and text input fields) that allow users to edit the validation logic (e.g., name, validator, format, and value type) of the validation rule. More specifically, a user (e.g., one of the users 114A-C) may use: text field 1104 to enter a name for the validation rule; drop-down menu 1106 to enter a validator for the validation rule; text field 1108 to enter a format for values; and drop-down menu 1110 to specify a value type.

Figure 11C:
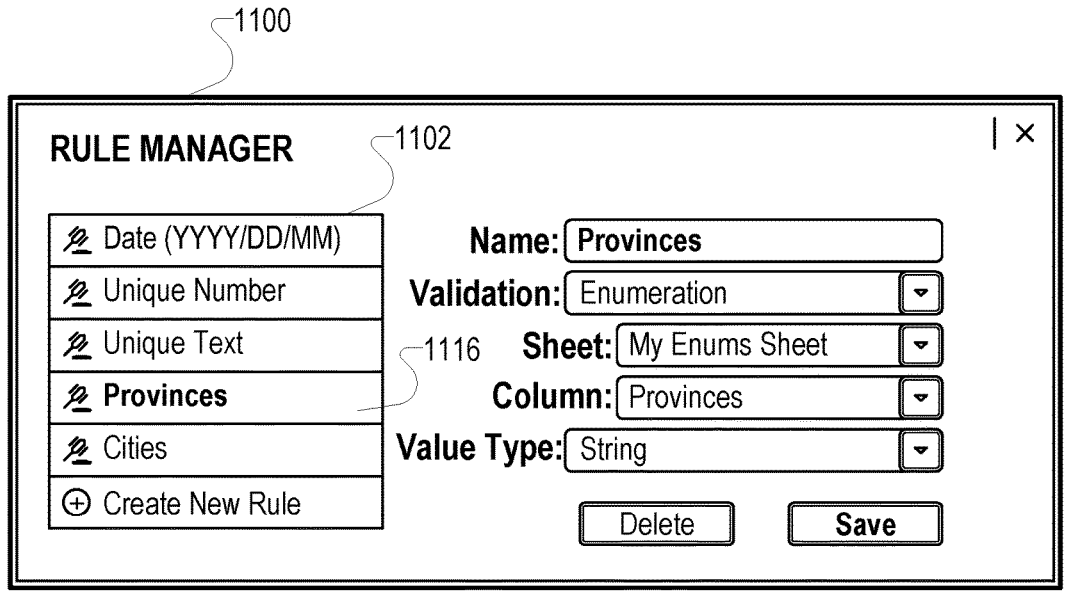

In the example illustrated in FIG. 11A, a user (e.g., one of the users 114A-C) has selected a rule 1112 that constrains data entered into cells of a particular column to dates. In the example illustrated in FIG. 11B, a user has selected a rule 1114 that constrains data entered into cells of a particular column to a unique number. In the example illustrated in FIG. 11C, a user has selected a rule 1116 that constrains data entered into cells of a particular column to a provinces in a particular number. As part of creating the rule 1116, the user may specify an additional spreadsheet and a column from that spreadsheet from which the provinces may be selected. Further, while a user is editing values in the column, the interface module 300 may provide a drop-down list comprising the list of provinces extracted from the specified column of the additional spreadsheet.

Figure 11D:
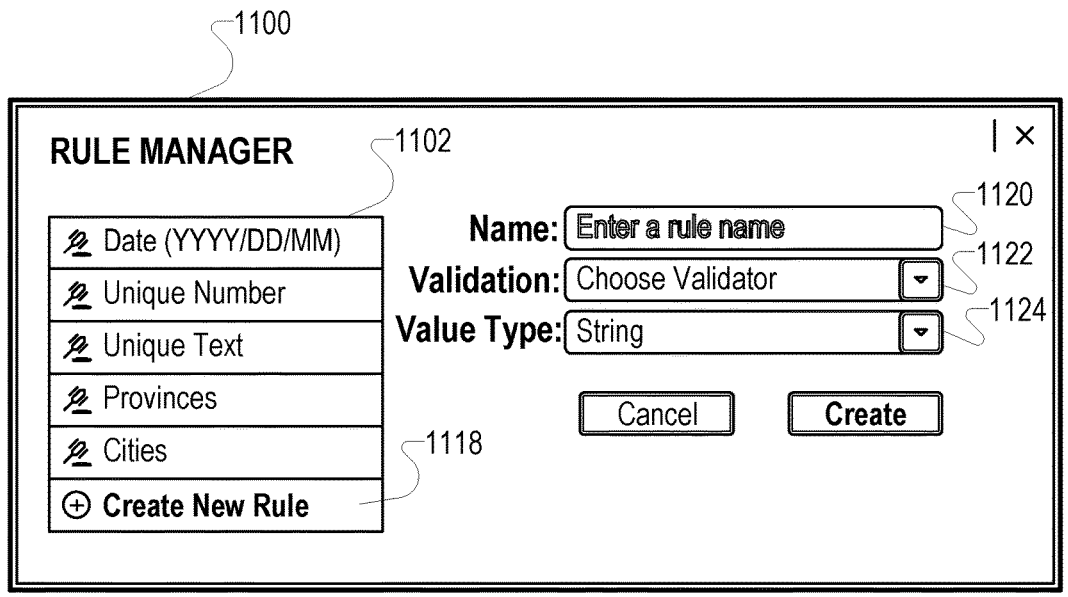
Figure 11E:
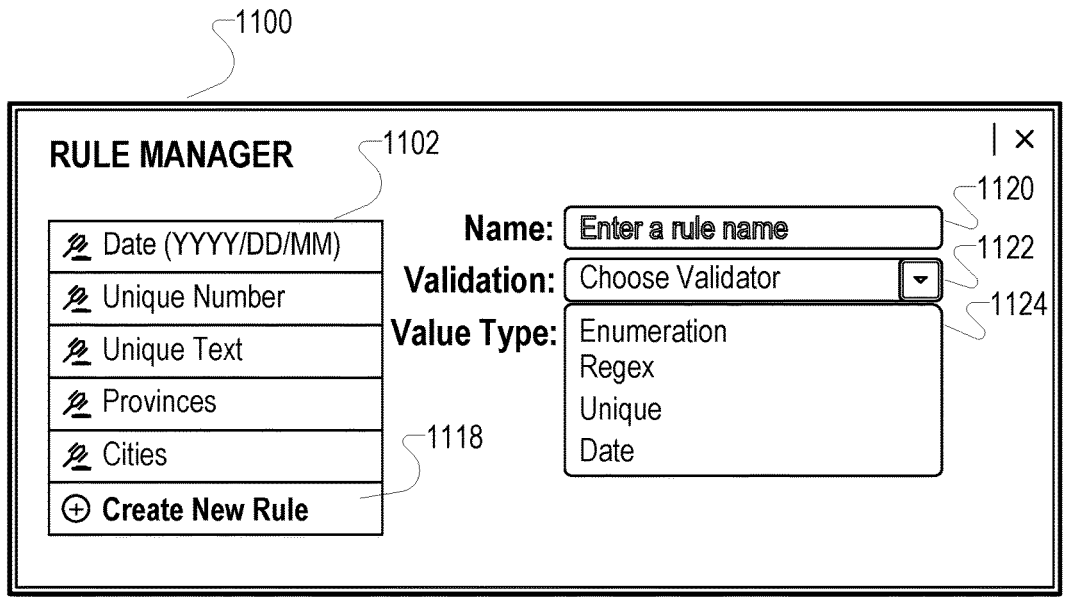
Figure 11F:
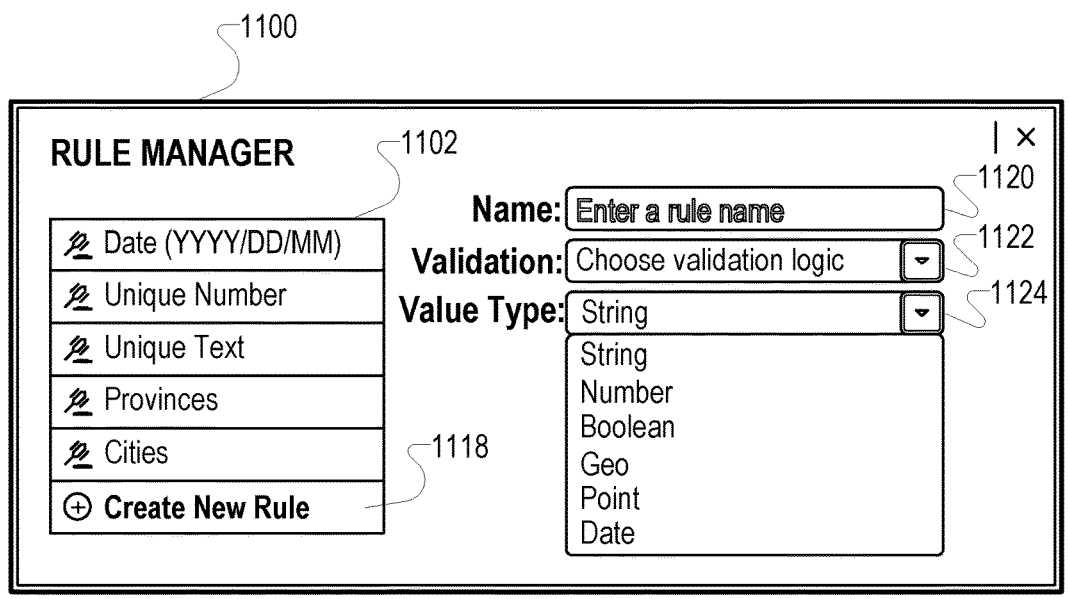

As shown in FIG. 11D, the list box 1102 also includes a selectable element 1118 that allows users to create a new validation rule. As part of this process, a user may specify a name for the new validation rule in text field 1120. Further, as shown in FIG. 11E, the user may select a validator for the validation rule using drop-down menu 1122. Lastly, as shown in FIG. 11F, the user may select a value type for the validation rule from the drop-down menu 1124.

FIG. 12 is an interface diagram illustrating a portion of an example spreadsheet 1200, according to some embodiments. As shown in FIG. 12, the spreadsheet 1200 includes a cell 1202, which has been visually distinguished (e.g., highlighted) from the remainder of the cells in the spreadsheet 1200. The cell 1202 may be visually distinguished in this manner in response to the validation module 304 determining the cell includes an invalid value (e.g., a value that does not comply with the validation rule for that column). As shown, a notification 1204 is also provided to notify users that the value is invalid.

Figure 13:
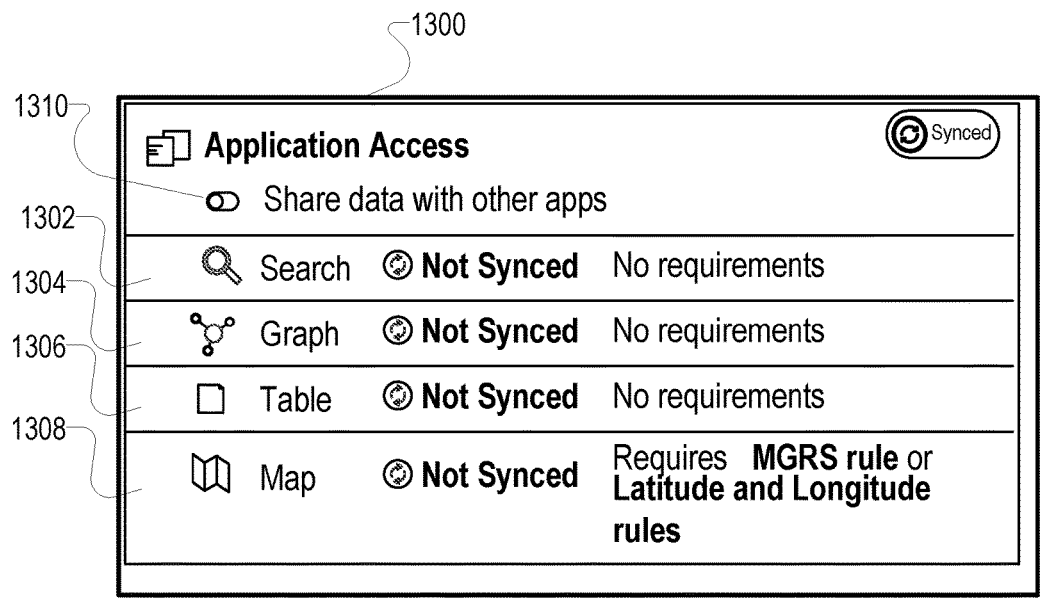

FIG. 13 is an interface diagram illustrating a synchronization interface 1300 configured to provide information related to synchronization of spreadsheet data with application data of network-based application 1302 (search application), network-based application 1304 (graphing application), network-based application 1306 (table creation application), and network-based application 1308 (map application), according to some embodiments. In particular, the synchronization interface 1300 provides a status of synchronization with the network-based applications 1302, 1304, 1306, and 1308 (e.g., synched or not synched). In some instances, a network-based application (e.g., application 1308) may employ a particular application data schema, and a list of constraints included in the application data schema of the application are presented to the user. Further, the synchronization module 306 may prevent spreadsheet data from being synchronized with application data if the validation rules of the corresponding spreadsheet do not include the constraints of the application data schema. Additionally, as with the synchronization dialog box 810 discussed in reference to FIGS. 8A-8C, the synchronization interface 1300 also includes a toggle 1310 that allows users to authorize the synchronization of the spreadsheet data of the spreadsheet with application data of network-based applications 1302, 1304, 1306, and 1308.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field-programmable gate array (FPGA) or an application specific integrated circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API 202).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Example Machine Architecture

Figure 14:
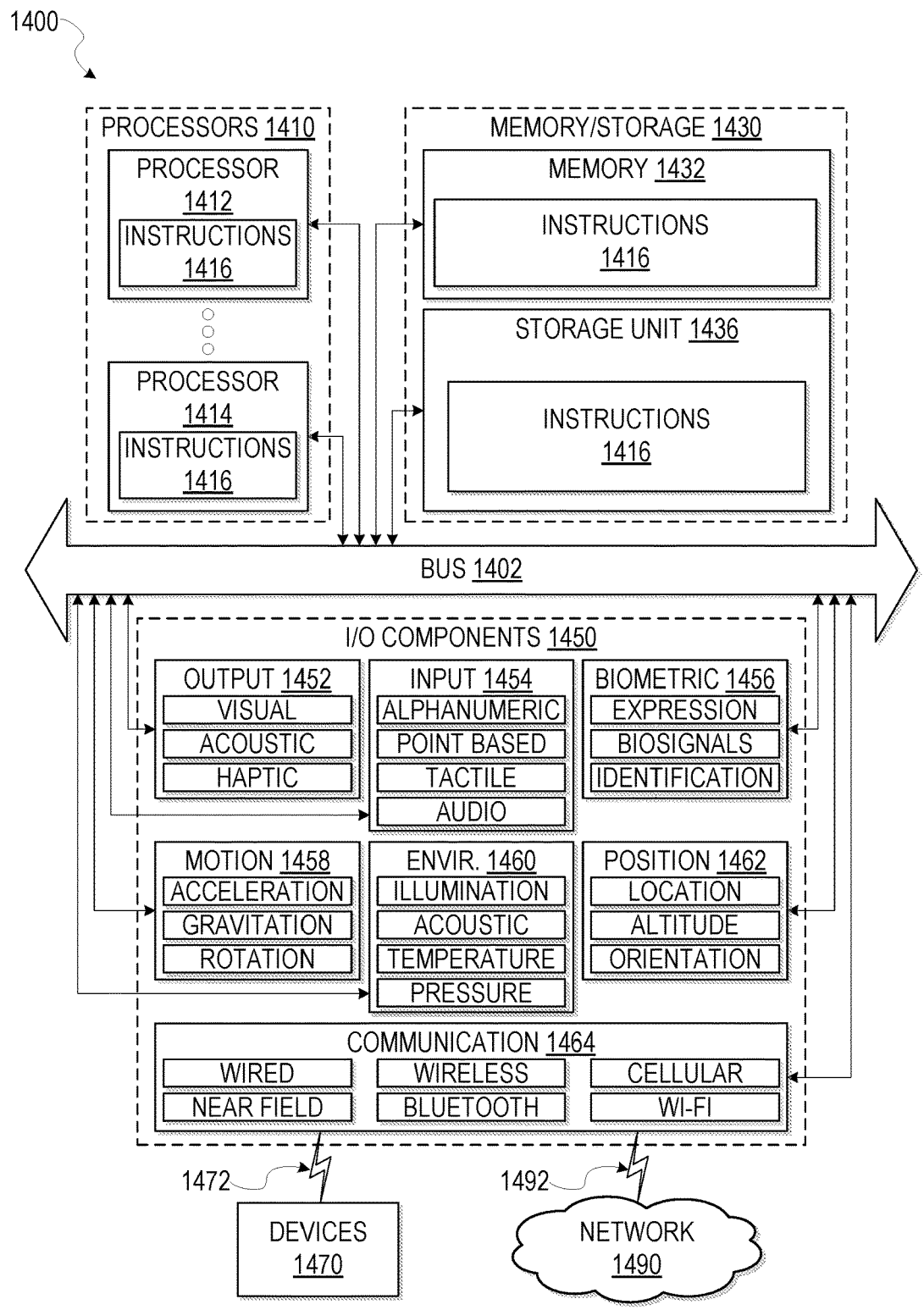
FIG. 14 is a diagrammatic representation of a machine in the example form of a computer system within which a set of instructions for causing the machine to perform any one or more of the methodologies discussed herein may be executed.

FIG. 14 is a block diagram illustrating components of a machine 1400, according to some example embodiments, able to read instructions from a machine-readable medium (e.g., a machine-readable storage medium) and perform any one or more of the methodologies discussed herein. Specifically, FIG. 14 shows a diagrammatic representation of the machine 1400 in the example form of a computer system, within which instructions 1416 (e.g., software, a program, an application, an applet, an app, or other executable code) for causing the machine 1400 to perform any one or more of the methodologies discussed herein may be executed. Additionally, or alternatively, the machine 1400 may correspond to any one of the collaboration platform 102, the user devices 110A-C, or the application server 108. The instructions transform the general, non-programmed machine into a particular machine programmed to carry out the described and illustrated functions in the manner described. In alternative embodiments, the machine 1400 operates as a standalone device or may be coupled (e.g., networked) to other machines. In a networked deployment, the machine 1400 may operate in the capacity of a server machine or a client machine in a server-client network environment, or as a peer machine in a peer-to-peer (or distributed) network environment. The machine 1400 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1416, sequentially or otherwise, that specify actions to be taken by the machine 1400. Further, while only a single machine 1400 is illustrated, the term "machine" shall also be taken to include a collection of machines 1400 that individually or jointly execute the instructions 1416 to perform any one or more of the methodologies discussed herein.

The machine 1400 may include processors 1410, memory/storage 1430, and input/output (I/O) components 1450, which may be configured to communicate with each other such as via a bus 1402. In an example embodiment, the processors 1410 (e.g., a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC), another processor, or any suitable combination thereof) may include, for example, a processor 1412 and a processor 1414 that may execute the instructions 1416. The term "processor" is intended to include multi-core processors that may comprise two or more independent processors (sometimes referred to as "cores") that may execute instructions contemporaneously. Although FIG. 14 shows multiple processors, the machine 1400 may include a single processor with a single core, a single processor with multiple cores (e.g., a multi-core processor), multiple processors with a single core, multiple processors with multiples cores, or any combination thereof.

The memory/storage 1430 may include a memory 1432, such as a main memory, or other memory storage, and a storage unit 1436, both accessible to the processors 1410 such as via the bus 1402. The storage unit 1436 and memory 1432 store the instructions 1416 embodying any one or more of the methodologies or functions described herein. The instructions 1416 may also reside, completely or partially, within the memory 1432, within the storage unit 1436, within at least one of the processors 1410 (e.g., within the processor's cache memory), or any suitable combination thereof, during execution thereof by the machine 1400. Accordingly, the memory 1432, the storage unit 1436, and the memory of the processors 1410 are examples of machine-readable media.

As used herein, "machine-readable medium" means a device able to store instructions and data temporarily or permanently, and may include, but is not limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store the instructions 1416. The term "machine-readable medium" shall also be taken to include any medium, or combination of multiple media, that is capable of storing instructions (e.g., instructions 1416) for execution by a machine (e.g., machine 1400), such that the instructions, when executed by one or more processors of the machine (e.g., processors 1410), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

Furthermore, the machine-readable medium is non-transitory in that it does not embody a propagating signal. However, labeling the tangible machine-readable medium "non-transitory" should not be construed to mean that the medium is incapable of movement; the medium should be considered as being transportable from one real-world location to another. Additionally, since the machine-readable medium is tangible, the medium may be considered to be a machine-readable device.

The I/O components 1450 may include a wide variety of components to receive input, provide output, produce output, transmit information, exchange information, capture measurements, and so on. The specific I/O components 1450 that are included in a particular machine will depend on the type of machine. For example, portable machines such as mobile phones will likely include a touch input device or other such input mechanisms, while a headless server machine will likely not include such a touch input device. It will be appreciated that the I/O components 1450 may include many other components that are not shown in FIG. 14. The I/O components 1450 are grouped according to functionality merely for simplifying the following discussion and the grouping is in no way limiting. In various example embodiments, the I/O components 1450 may include output components 1452 and input components 1454. The output components 1452 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1454 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1450 may include biometric components 1456, motion components 1458, environmental components 1460, or position components 1462 among a wide array of other components. For example, the biometric components 1456 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1458 may include acceleration sensor components (e.g., accelerometer), gravitation sensor components, rotation sensor components (e.g., gyroscope), and so forth. The environmental components 1460 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1462 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1450 may include communication components 1464 operable to couple the machine 1400 to a network 1490 or devices 1470 via a coupling 1492 and a coupling 1472, respectively. For example, the communication components 1464 may include a network interface component or other suitable device to interface with the network 1490. In further examples, the communication components 1464 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1470 may be another machine or any of a wide variety of peripheral devices (e.g., a peripheral device coupled via a Universal Serial Bus (USB)).

Moreover, the communication components 1464 may detect identifiers or include components operable to detect identifiers. For example, the communication components 1464 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF4140, Ultra Code, UCC RSS-2D bar code, and other optical codes), or acoustic detection components (e.g., microphones to identify tagged audio signals). In addition, a variety of information may be derived via the communication components 1464, such as location via Internet Protocol (IP) geo-location, location via Wi-Fi® signal triangulation, location via detecting an NFC beacon signal that may indicate a particular location, and so forth.

Transmission Medium

In various example embodiments, one or more portions of the network 1490 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 1490 or a portion of the network 1490 may include a wireless or cellular network and the coupling 1492 may be a Code Division Multiple Access (CDMA) connection, a Global System for Mobile communications (GSM) connection, or another type of cellular or wireless coupling. In this example, the coupling 1482 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 1416 may be transmitted or received over the network 1490 using a transmission medium via a network interface device (e.g., a network interface component included in the communication components 1464) and using any one of a number of well-known transfer protocols (e.g., HTTP). Similarly, the instructions 1416 may be transmitted or received using a transmission medium via the coupling 1472 (e.g., a peer-to-peer coupling) to the devices 1470. The term "transmission medium" shall be taken to include any intangible medium that is capable of storing, encoding, or carrying the instructions 1416 for execution by the machine 1400, and includes digital or analog communications signals or other intangible media to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

In this document, the terms "a" or "an" are used, as is common in patent documents, to include one or more than one, independent of any other instances or usages of "at least one" or "one or more." In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim. Moreover, in the following claims, the terms "first," "second," "third," and so forth are used merely as labels, and are not intended to impose numerical requirements on their objects.

What is claimed is:

1. A system comprising:
one or more processors of a machine; and
a memory storing instructions that, when executed by at least one processor among the one or more processors, causes the machine to perform operations comprising:
accessing spreadsheet data of a spreadsheet having one or more data validation rules;
causing display of a synchronization interface to present a status of synchronization of the spreadsheet data with each of a plurality of applications hosted by one or more application servers, the status of synchronization of the spreadsheet data with a first application indicating the spreadsheet data is synchronized with the first application;
accessing an application data schema comprising a set of constraints on application data consumed by a second application from among the plurality of applications;
determining whether the one or more data validation rules include the set of constraints;
in response to determining the one or more data validation rules exclude at least one constraint from the set of constraints, causing display within the synchronization interface, of a notification that includes an indication that the application data is unable to be synchronized with the spreadsheet data, the notification specifying one or more additional validation rules to associate with the spreadsheet to trigger synchronization of the application data with the spreadsheet data, the one or more additional validation rules specified in the notification corresponding to the at least one constraint that has been determined to be excluded from the one or more data validation rules;
causing display of a window that includes a user selectable list of predefined validation rules for association with one or more cells in the spreadsheet;
receiving a user selection, from the user selectable list, of one or more predefined validation rules for association with the one or more cells in the spreadsheet; and
in response to determining the one or more predefined data validation rules selected from the user selectable list include the at least one constraint from the set of constraints, synchronizing the application data consumed by the second application with the spreadsheet data corresponding to the spreadsheet.

2. The system of claim 1, wherein
the application data schema is a first application data schema;
the set of constraints is a first set of constraints; and
the operations further comprise:
accessing a further application data schema comprising a second set of constraints on application data consumed by a third application;
determining the one or more data validation rules include the second set of constraints; and
in response to determining the one or more data validation rules include the second set of constraints, synchronizing the application data consumed by the third application with the spreadsheet data.

3. The system of claim 1, wherein the operations further comprise:
validating the spreadsheet according to the one or more data validation rules.

4. The system of claim 1, wherein the operations further comprise:
determining at least one cell in the spreadsheet includes an invalid entry; and
in response to determining the at least one cell in the spreadsheet includes the invalid entry, causing the at least one cell to be visually distinguished from remaining cells during display of the spreadsheet.

5. The system of claim 1, wherein the operations further comprise:
receiving, from a client device accessing the spreadsheet, a modification to at least one entry in the spreadsheet;
validating the at least one entry according to the one or more data validation rules; and
synchronizing the application data consumed by the second application with the spreadsheet data such that the application data includes the modification to the at least one entry in the spreadsheet.

6. The system of claim 5, wherein:
the client device is a first client device from among a plurality of client devices accessing the spreadsheet;
the operations further comprise:
receiving, from a second client device accessing the spreadsheet, an additional modification to at least one additional entry in the spreadsheet;
validating the at least one additional entry according to the one or more data validation rules; and
synchronizing the application data consumed by the second application with the spreadsheet data such that the application data includes the additional modification to the at least one additional entry in the spreadsheet.

7. The system of claim 1, wherein the operations further comprise:
validating data included in the one or more cells according to the additional data validation rule.

8. The system of claim 1, wherein the receiving of the additional data validation rule comprises:
receiving, from a client device, user specified logic, the logic comprising a name, a validator, and a value type; and
receiving, from the client device, one or more user specified configuration parameters.

9. The system of claim 8, wherein the operations further comprise:
providing, for display on a second client device accessing the spreadsheet, a help widget associated with the validator, the help widget comprising one or more input elements operable to enter data into the one or more cells.

10. The system of claim 9, wherein the help widget is selected from the group consisting of a date picker, an autocomplete dropdown, a geo-coordinate input widget, and a search widget.

11. A method comprising:
accessing spreadsheet data of a spreadsheet having one or more data validation rules;
causing display of a synchronization interface to present a status of synchronization of the spreadsheet data with respect to a plurality of applications hosted by one or more application servers;
accessing an application data schema comprising a set of constraints on application data consumed by an application from among the plurality of applications;
determining, by one or more processors, whether the one or more data validation rules include the set of constraints;
in response to determining the one or more data validation rules exclude at least one constraint from the set of constraints, causing display, within the synchronization interface, of a notification that includes an indication that the application data is unable to be synchronized with the spreadsheet data, the notification specifying, one or more additional validation rules to associate with the spreadsheet to trigger synchronization of the application data with the spreadsheet data, the one or more additional validation rules corresponding to the at least one constraint that has been determined to be excluded from the one or more data validation rules;
causing display of a window that includes a user selectable list of predefined validation rules for association with one or more cells in the spreadsheet;
receiving a user selection, from the user selectable list, of one or more predefined validation rules the one or more additional data validation rules for association with the one or more cells in the spreadsheet; and
in response to determining the one or more predefined data validation rules selected from the user selectable list include the at least one constraint from the set of constraints, synchronizing application data consumed by the application with the spreadsheet data corresponding to the spreadsheet.

12. The method of claim 11, wherein
the application data schema is a first application data schema;
the application is a first application;
the set of constraints is a first set of constraints; and
the operations further comprise:
accessing a second application data schema comprising a second set of constraints on application data consumed by a second application;
determining the one or more data validation rules include the second set of constraints; and
in response to determining the one or more data validation rules include the second set of constraints, synchronizing the application data consumed by the second application with the spreadsheet data.

13. The method of claim 11, further comprising validating the spreadsheet according to the one or more data validation rules.

14. The method of claim 11, further comprising:
determining at least one cell in the spreadsheet includes an invalid entry; and
in response to determining the at least one cell in the spreadsheet includes the invalid entry, causing the at least one cell to be visually distinguished from remaining cells during display of the spreadsheet.

15. The method of claim 11, further comprising:
receiving, from a client device accessing the spreadsheet, a modification to at least one entry in the spreadsheet;
validating the at least one entry according to the one or more data validation rules; and
synchronizing the application data consumed by the application with the spreadsheet data such that the application data includes the modification to the at least one entry in the spreadsheet.

16. The method of claim 15, wherein:
the client device is a first client device from among a plurality of client devices accessing the spreadsheet;
the operations further comprise:
receiving, from a second client device accessing the spreadsheet, an additional modification to at least one additional entry in the spreadsheet;
validating the at least one additional entry according to the one or more data validation rules; and
synchronizing the application data consumed by the application with the spreadsheet data such that the application data includes the additional modification to the at least one additional entry in the spreadsheet.

17. The method of claim 11, wherein the operations further comprise:
validating data included in the one or more cells according to the one or more predefined data validation rules.

18. The method of claim 11, wherein the synchronizing of the application data with the spreadsheet data occurs without manual user intervention.

19. The method of claim 11, further comprising:
providing, for display on a client device accessing the spreadsheet, an associated help widget, the help widget comprising one or more input elements operable to enter data into the one or more cells.

20. A non-transitory machine-readable storage medium embodying instructions that, when executed by at least one processor of a machine, cause the machine to perform operations comprising:
accessing spreadsheet data of a spreadsheet having one or more data validation rules;
causing display of a synchronization interface to present a status of synchronization of the spreadsheet data with respect to a plurality of applications hosted by one or more application servers;
accessing an application data schema comprising a set of constraints on application data consumed by an application from among the plurality of applications;
determining whether the one or more data validation rules include the set of constraints;
in response to determining the one or more data validation rules exclude at least one constraint from the set of constraints, causing display, within the synchronization interface, of a notification that includes an indication that the application data is unable to be synchronized with the spreadsheet data, the notification specifying one or more additional validation rules to associate with the spreadsheet to trigger synchronization of the application data with the spreadsheet data, the one or more additional validation rules specified in the notification corresponding to the at least one constraint that is excluded from the one or more data validation rules;
causing display of a window that includes a user selectable list of predefined validation rules for association with one or more cells in the spreadsheet;
receiving a user selection, from the user selectable list, of one or more predefined validation rules the one or more additional data validation rules for association with the one or more cells in the spreadsheet; and in response to determining the one or more predefined data validation rules selected from the user selectable list include the at least one constraint from the set of constraints, synchronizing application data consumed by the application with spreadsheet data corresponding to the spreadsheet.

* * * * *

UNITED STATES PATENT AND TRADEMARK OFFICE
CERTIFICATE OF CORRECTION

PATENT NO. : 10,552,531 B2
APPLICATION NO. : 15/258918
DATED : February 4, 2020
INVENTOR(S) : Yousaf et al.

Page 1 of 1

It is certified that error appears in the above-identified patent and that said Letters Patent is hereby corrected as shown below:

On the Title Page

On page 4, in Column 2, under "Other Publications", Lines 23-24, delete "Englineering)"," and insert --Engineering)",-- therefor In the Claims In Column 19, Line 45, in Claim 1, after "display", insert --,--

In Column 20, Line 1, in Claim 2, after "wherein", insert --:--

In Column 21, Line 23, in Claim 11, delete "specifying," and insert --specifying-- therefor In Column 21, Line 43, in Claim 12, after "wherein", insert --:--

Signed and Sealed this
Twenty-second Day of September, 2020

Andrei Iancu
*Director of the United States Patent and Trademark Office*